(12) United States Patent
Kamata et al.

(10) Patent No.: US 8,526,269 B2
(45) Date of Patent: Sep. 3, 2013

(54) METHODS AND SYSTEMS FOR DEPLOYING SEISMIC DEVICES

(75) Inventors: Masahiro Kamata, Kawasaki (JP); Tsunehisa Kimura, Edinburgh (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 354 days.

(21) Appl. No.: 12/364,519

(22) Filed: Feb. 3, 2009

(65) Prior Publication Data

US 2010/0195436 A1    Aug. 5, 2010

(51) Int. Cl.
*G01V 1/52* (2006.01)
*G01V 1/40* (2006.01)

(52) U.S. Cl.
USPC ............... 367/25; 367/16; 367/188; 181/102

(58) Field of Classification Search
USPC ................ 166/117.5, 208, 240, 255.2, 297, 166/382; 175/4.51; 181/103, 106, 110, 113, 181/120, 121, 122; 367/25, 30, 32, 33, 60, 367/75; 702/14
See application file for complete search history.

(56) References Cited

U.S. PATENT DOCUMENTS

| | | | | |
|---|---|---|---|---|
| 2,745,345 A | * | 5/1956 | Sweetman | 166/63 |
| 3,730,282 A | * | 5/1973 | Chapman | 175/4.51 |
| 4,064,938 A | | 12/1977 | Fast | |
| 4,709,362 A | | 11/1987 | Cole | |
| 5,051,962 A | * | 9/1991 | Eaton | 367/33 |
| 5,343,963 A | * | 9/1994 | Bouldin et al. | 175/27 |
| 5,355,949 A | | 10/1994 | Sparlin et al. | |
| 5,475,187 A | * | 12/1995 | Omnes | 181/102 |
| 6,175,536 B1 | * | 1/2001 | Khan | 367/32 |
| 6,848,510 B2 | | 2/2005 | Bixenman et al. | |
| 7,083,006 B2 | * | 8/2006 | Kruspe et al. | 175/40 |
| 7,240,738 B2 | * | 7/2007 | Pendleton | 166/382 |
| 2004/0144539 A1 | | 7/2004 | Smith et al. | |
| 2005/0082061 A1 | | 4/2005 | Nguyen et al. | |
| 2005/0263340 A1 | * | 12/2005 | Shehab et al. | 181/121 |
| 2006/0032637 A1 | | 2/2006 | Ayoub et al. | |
| 2007/0187170 A1 | * | 8/2007 | Lien et al. | 181/110 |

FOREIGN PATENT DOCUMENTS

| | | | |
|---|---|---|---|
| EP | 0178784 A2 | * | 9/1985 |
| EP | 0872626 | | 6/2005 |
| RU | 2231635 | | 6/2004 |
| SU | 1574796 | | 6/1990 |

* cited by examiner

*Primary Examiner* — Isam Alsomiri
*Assistant Examiner* — Daniel L Murphy
(74) *Attorney, Agent, or Firm* — Jianguang Du; Jody DeStefanis

(57) ABSTRACT

Methods and systems for acoustically determining reservoir parameters of subterranean formations. A tool comprising at least one seismic source or seismic receiver mounted thereon; a conveyance configured for movement of the acoustic tool in a borehole traversing the subterranean formations; and a source retainer configured or designed for permanent deployment in the borehole to removably retain the acoustic tool in the borehole. The source retainer when deployed provides acoustic coupling with the borehole and removably retains the acoustic tool in the borehole so that, over multiple deployments, the acoustic tool is repeatedly deployed at the same predetermined location and orientation relative to the subterranean formation, and with the same acoustic coupling to the borehole.

20 Claims, 19 Drawing Sheets

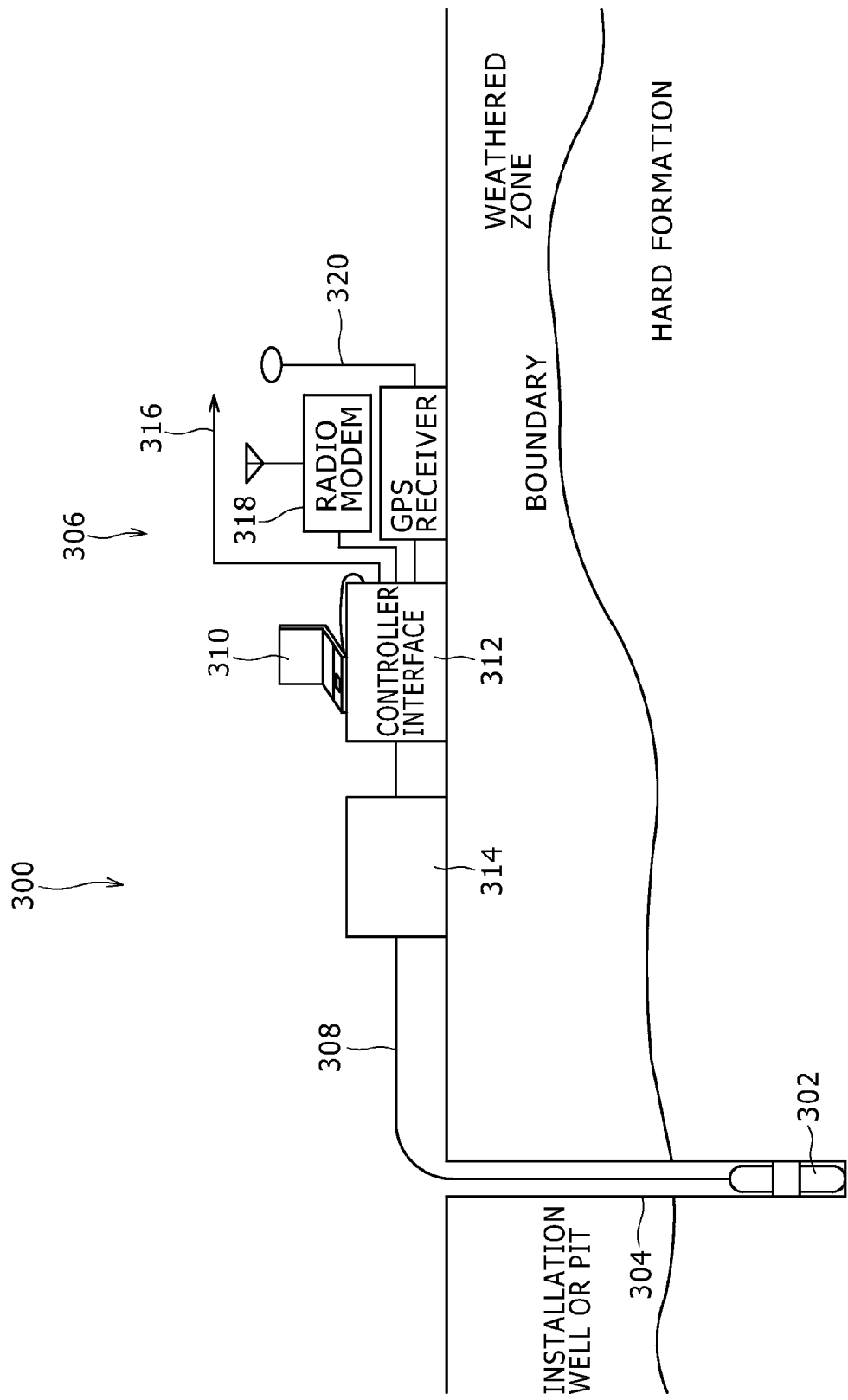

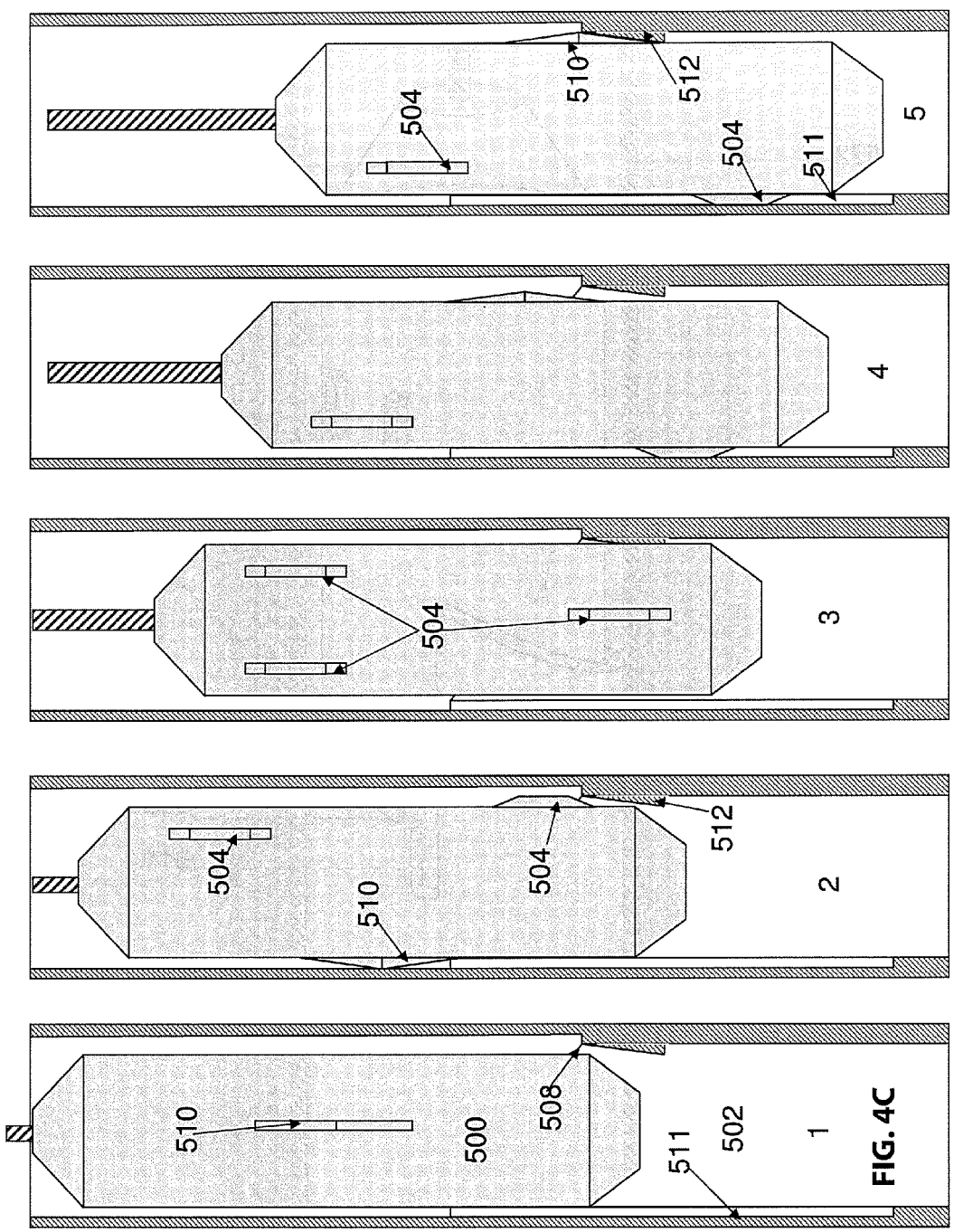

METHODS AND SYSTEMS FOR DEPLOYING SEISMIC DEVICES

BACKGROUND

1. Field of the Invention

The present disclosure relates generally to methods and systems for performing acoustic measurements of subterranean formations. More specifically, some aspects disclosed herein are directed to methods and systems for deploying seismic devices, such as seismic sources and/or receivers, in a borehole for characterizing subterranean formations having, for example, oil and/or gas deposits therein. The methods and systems utilize permanent downhole installations that removably retain retrievable seismic tools having one or more seismic instrumentation such that the seismic instrumentation has a fixed location and orientation relative to the subterranean formations.

2. Background of Related Art

Seismic exploration can provide valuable information useful in the drilling and operation of oil and gas wells. Seismic measurements of the type described herein are also useful in the fields of $CO_2$ sequestration, development of methane hydrate deposits, water reservoir monitoring, microearthquake monitoring, and monitoring for reservoir delineation, among other applications that are known to persons skilled in the art. Seismic measurements are conducted with energy that is introduced by a seismic source to create a seismic signal that propagates throughout the subterranean formation. This seismic signal is reflected to differing degrees by features that are of interest. A receiver monitors these reflected signals to help generate a seismic map of the underground features. This map is generated by knowing the exact time that a seismic signal was generated as compared to the time that the reflected signal is received. As a practical matter, the system comprises a plurality of sources and receivers to provide the most comprehensive map possible of subterranean features. Different configurations may yield two dimensional or three dimensional results depending on their mode of operation.

In typical seismic exploration, it is necessary to cover a large surface area where the deposits of interest, such as oil and/or gas, are located. Since productivity is key for this business, the seismic devices, such as the source(s) and receiver(s) and associated electronics, are moved to different locations to cover the area of interest. In this, such seismic surveying operations require efficient and fast acquisition of seismic measurements.

Long term monitoring in contrast is geared towards the periodic monitoring of seismic events and/or the slow movement of fluids in a subterranean reservoir. A reservoir extends over a limited area. Typically the length of data acquisition time is less of a constraint. In this, small changes in the reservoir are detected using, for example, time lapse techniques. Seismic data acquisition is governed by the timing of the seismic events or changes in the reservoir. Small changes in seismic wave reflection are detected by locating the seismic devices, such as the source and receiver, at the same position with the same orientation relative to the subterranean formations, and the same coupling condition. However, an instrument has limited life and eventually it fails. If the instrument is retrieved from its deployed position, for example, for maintenance, it is not possible to easily re-deploy the instrument at the same location, in the same orientation and with the same coupling condition. This poses a problem in long term monitoring operations.

In a typical seismic survey operation utilizing, for example, vibroseis sources, large vibrator trucks are deployed to introduce seismic energy into the subsurface for purposes of reservoir imaging. Such systems are very large in size and costly. Impulsive sources such as an airgun or dynamite provide a large amount of seismic energy instantaneously for a relatively short duration of time, typically in the order of a few hundred milliseconds. In contrast, a vibrator provides low seismic power, but sweep time is comparatively long, typically 20 to 30 seconds. Hence, the total amount of energy that is generated is the same for the two types of source devices.

As mentioned above, typically fast data acquisition is not a factor in relation to permanent sources with fixed receivers that are used in, for example, reservoir monitoring. Data acquisition may extend for one hour or more. Therefore, it is practical to deploy a small seismic source downhole for purposes of seismic surveying by using the source for a suitable length of time to generate the appropriate amount of seismic energy.

Table 1 below shows an order of magnitude comparison of the different types of seismic sources discussed in the preceding.

|  | P [W] | t [sec] | E [J] |
|---|---|---|---|
| Airgun | 1000 | 0.2 | 200 |
| Vibrator | 10 | 20 | 200 |
| Permanent source | 0.1 | 3600 | 360 |

In view of the foregoing, the applicants recognized that it would be advantageous to deploy downhole seismic devices in a manner that is most cost efficient and reliable for purposes of long term seismic monitoring. Applicants discovered that it is possible to utilize a compact seismic source system that is deployable in a borehole for purposes of seismic surveying. However, seismic sources need comprehensive maintenance and support. Therefore, conventional seismic sources are often not suitable for permanent or semi-permanent deployment to monitor subsurface reservoirs.

Alternative seismic energy sources such as airguns and dynamite also are known in the art. However, in certain applications, such as active permanent monitoring, the aforementioned seismic energy sources have shortcomings such as safety, size, cost, required maintenance, repeatability, and environmental impact.

The applicants further recognized that it is advantageous to have retrievable seismic devices, such as seismic sources and receivers, for downhole use. Available downhole seismic instrumentation tends to be fragile and may not last for an extended period of time without periodic maintenance. Downhole seismic instruments are expensive, and it is wasteful to permanently deploy them in a borehole if their use is limited. It is preferable to retrieve the seismic devices after a seismic surveying operation and to redeploy the devices when needed for seismic surveying. In this way, the same seismic devices may be deployed at different wellsite so that overall costs and depreciation are reduced. However, when redeployed at a previous wellsite it is necessary that the seismic devices be located at the same position, in the same orientation, and with the same coupling condition as the previous seismic operation.

There is need for improved methods and systems for deploying seismic devices for purposes of acoustically monitoring subterranean formations to derive key parameters relating to the formations. Specifically, there is need for techniques for deployment of seismic sources and receivers in a safe manner with low environmental impact for purposes such as active or passive monitoring with high repeatability. For example, it is desirable to deploy seismic devices at transition zones, such as at a swamp or shallow water lake/sea, by anchoring or latching the devices in the hole.

In this, one object of the present disclosure is to provide an improved mechanism for deployment of downhole seismic sources and receivers. Another object of the present disclosure is to enable deployment of seismic devices by anchoring in a well or a hole for seismic acquisition.

SUMMARY OF THE DISCLOSURE

The disclosure herein may meet at least some of the above-described needs and others. In consequence of the background discussed above, and other factors that are known in the field of formation analysis, applicants recognized need for methods and systems for deploying seismic devices downhole for purposes of acoustically monitoring subterranean formations in a reliable, efficient manner with high repeatability. In this, applicants recognized that a deployment mechanism was needed that could position a seismic source device or a seismic receiver device in a borehole at a constant position for active monitoring of subterranean formations over extended periods of time.

Additionally, applicants recognized a need for seismic source devices that generate seismic signals efficiently with repeatability, and have suitable source bandwidth, for example, low frequency acoustic energy for deep imaging. Additionally, applicants recognized that the ability to remove seismic devices from the downhole locations and to return them to the original position(s) provides significant advantages in semi-permanent/permanent reservoir monitoring operations.

Some of the methods and systems disclosed herein are directed at the deployment of seismic mechanisms using technologies proposed herein to monitor key reservoir parameters in relation to the production of oil and/or gas.

In one aspect of the present disclosure, a system for taking acoustic measurements relating to subterranean formations comprises an acoustic tool having at least one of a seismic source and a seismic receiver mounted thereon; a conveyance configured for movement of the acoustic tool in a borehole traversing the subterranean formations; a tool retainer configured or designed for permanent deployment in the borehole and, when deployed, being acoustically coupled to the borehole to removably retain the tool in the borehole so that the tool is deployed at a predetermined location and orientation relative to the subterranean formations; a computer in communication with the acoustic tool; and a set of instructions executable by the computer that, when executed, process the acoustic measurements; and derive parameters relating to the formation based on the acoustic measurements.

In one embodiment of the present disclosure, the acoustic tool and the tool retainer are configured or designed such that the acoustic tool is deployed in or removed from the tool retainer by the downward or upward movement of the acoustic tool by the conveyance. In certain aspects herein, the tool comprises a housing, and a plurality of standoffs and a wedge located on the outside of the housing. In some embodiments, three standoffs are provided to effectively stabilize the tool in the borehole and to provide acoustic coupling with the borehole. The tool retainer comprises a slide and a groove. The plurality of standoffs of the tool housing are structured and arranged to contact the slide of the tool retainer as the tool is lowered in the borehole such that at least one of the standoffs locks into the groove of the tool retainer so that the tool is deployed at a predetermined location and orientation relative to the subterranean formations. The tool retainer may be configured or designed to be located at the bottom of a borehole casing.

In other embodiments of the present disclosure, the tool comprises three standoffs and a spring-actuated locking arm located on the outside of the tool housing; and the tool retainer comprises a slide and a groove located on an inner surface of a borehole casing joint, wherein the tool locking arm is structured and arranged to be extendible to contact the slide of the casing joint as the tool is lowered in the borehole so that the locking arm locks into the groove of the casing joint such that the tool is stabilized and is locked to the borehole casing by the engagement of the tool locking arm and the casing joint groove to deploy the tool at a predetermined location and orientation relative to the subterranean formations.

In yet other embodiments, the system comprises an array of acoustic tools wherein each acoustic tool comprises three standoffs and a spring-actuated locking arm located on the outside of the tool housing; and the tool retainer comprises a plurality of borehole casing joints. Each casing joint has a slide and a groove located on an inner surface of the casing joint, wherein the tool locking arm of each acoustic tool is structured and arranged to be extendible to contact the slide of a corresponding one of the plurality of borehole casing joints as the tool array is lowered in the borehole so that the locking arm of each acoustic tool locks into a corresponding groove of one of the plurality of casing joints such that each tool of the acoustic tool array is stabilized and is locked to the borehole casing to deploy each tool of the tool array at a predetermined location and orientation relative to the subterranean formations. Sections of the conveyance between adjacent tools of the acoustic tool array have slack to prevent acoustic propagation between tools through the conveyance. In other words, the separation between the tools in an array is longer than the separation between the casing joints that are designated for receiving the individual tools in the array. The cable length between adjacent tools in the array is slightly longer, for example, 5% longer, than the separation between adjacent designated casing joints so that all the tools are able to fit into their designated casing joints. Otherwise, the top tool will be anchored, but the tools below may be situated above their designated locking points and unable to anchor. In this, the conveyance that is used for such deployment of a tool array is cable.

In some embodiments of the present disclosure, the conveyance comprises tubing having a cradle for removably retaining the acoustic tool on the tubing for deployment of the acoustic tool in a borehole. The tool comprises three standoffs and a spring-actuated locking arm located on the outside of the tool housing; and the tool retainer comprises a slide and a groove located on an inner surface of a borehole casing joint, wherein the tool locking arm is structured and arranged to be extendible to contact the slide of the casing joint as the tubing is lowered in the borehole so that the locking arm locks into the groove of the casing joint such that the tool is stabilized and is locked to the borehole casing by the engagement of the tool locking arm and the casing joint groove to deploy the tool at a predetermined location and orientation relative to the subterranean formations. The tubing cradle is configured such that the acoustic tool is disengaged from the cradle after deployment for acoustic isolation.

In another embodiment of the present disclosure, the tool comprises an outer jacket; and a plurality of standoffs, a slide and a groove located on the jacket. The tool retainer comprises a projection attached to an inner surface of a borehole casing. In some embodiments, three standoffs of the tool jacket are structured and arranged such that the tool retainer projection contacts the tool jacket slide as the tool is lowered in the borehole so that the projection locks into the groove of the tool jacket to deploy the tool at a predetermined location and orientation relative to the subterranean formations.

In some embodiments of the present disclosure, the system further comprises an array of receivers configured or designed to be located in an adjacent borehole traversing the subterranean formations. In certain embodiments herein, the system may be configured for crosswell data acquisition and/or for monitoring fluids injection into the subterranean formations through an injection well.

In other embodiments of the present disclosure, the system further comprises a seabed cable having an array of spaced receivers configured or designed to be located at a seabed; and the system is configured for marine data acquisition. The acoustic tool may comprise a bottom hole assembly including the at least one of a seismic source and a seismic receiver.

The system may comprise a controller section operably connected to the seismic receiver and configured to adjust data acquisition parameters; a communications interface operably connected to the controller; and a processing unit. The seismic receiver may be configured to transmit electrical signals through the controller section and the communications interface to the processing unit, and the processing unit may be configured to perform signal processing using the electrical signals from the receiver.

The present disclosure provides an acoustic tool configured for deployment in a borehole traversing a subterranean formation. The tool comprises at least one seismic tool and is configured for movement in a borehole; the at least one seismic tool being configured or designed to be removably retained by a tool retainer permanently deployed in the borehole so that the seismic tool is deployed at a predetermined location and orientation relative to the subterranean formation.

A method for taking acoustic measurements relating to a subterranean formation is provided. The method includes deploying a conveyance and an acoustic tool in a borehole traversing the subterranean formation, the acoustic tool comprising at least one of a seismic source and a seismic receiver; removably retaining the acoustic tool in the borehole so that the tool is deployed at a predetermined location and orientation relative to the subterranean formation, the tool being acoustically coupled to the borehole; acquiring acoustic measurements; processing the acoustic measurements; and deriving parameters relating to the formation based on the acoustic measurements.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

FIGS. 3A to 3C illustrate schematically additional exemplary operational contexts of the present disclosure with exemplary systems for acoustically monitoring subterranean formations according to the principles described herein.

FIG. 4C is a step-by-step depiction of the deployment of an acoustic tool in a tool retainer according to the principles described herein.

Figure 8:
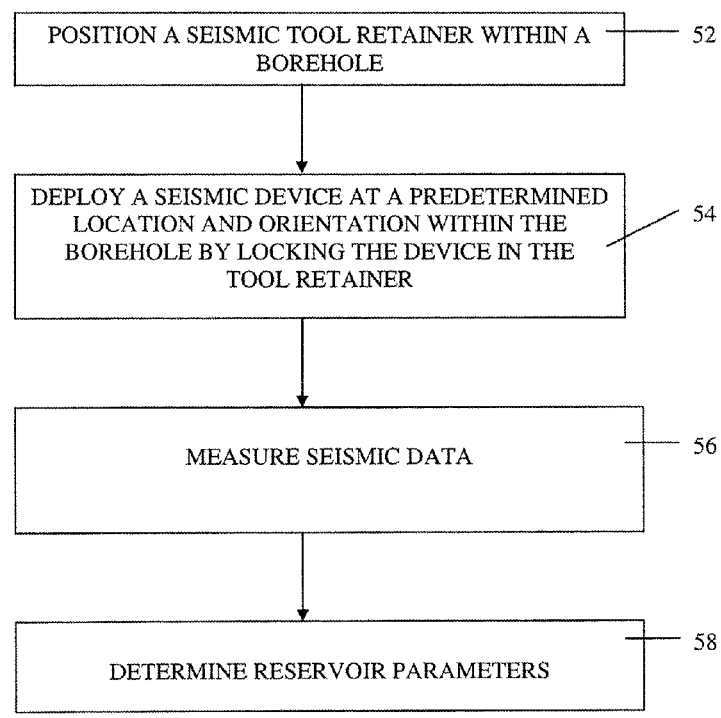

FIG. 8 outlines steps in one method according to the present disclosure.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
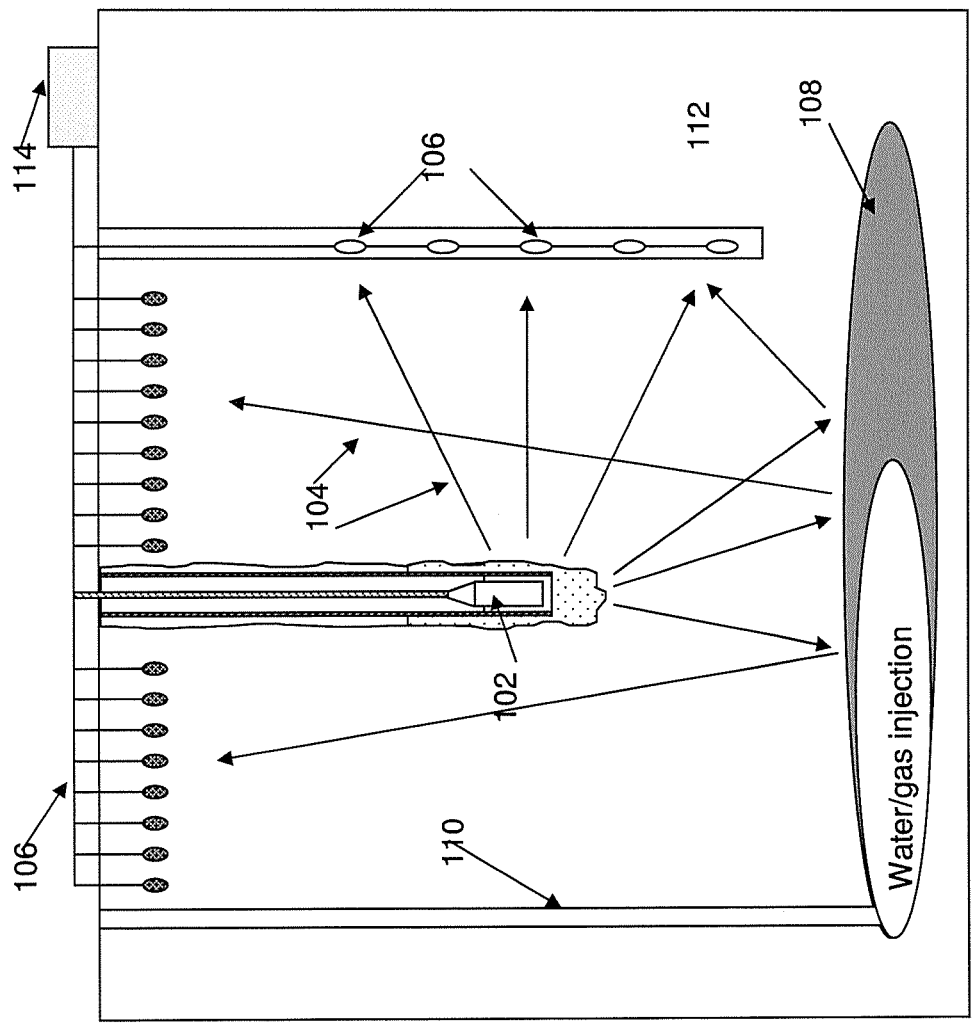
FIG. 1 is a schematic representation of one exemplary operational context of the methods and systems of the present disclosure.

Referring to FIG. 1, as mentioned above it is desirable to use seismic information to develop maps or images of underground features using a seismic source 102 generating a seismic signal 104. A downhole seismic source is used just above the zone of interest, in this case just above the movement of the injected fluid, to determine the geological characteristics of the underground strata in the region surrounding the well in which the source is placed. Receivers such as accelerometers, geophones, or hydrophones detect these seismic waves after they have traveled through the underground strata. If the injected gas leaks from the reservoir and migrates above the reservoir, such signature may be detected by sensors 106 deployed in a borehole. After processing, the measured waves can be used to determine the characteristics of the reflecting surfaces in the strata through which they have traveled.

In a first measurement technique, the receivers 106 are placed on the surface. In a second measurement technique, the receivers are placed in wells which are different from the well in which the source is located. This technique is known as crosswell or interwell seismic. Finally, the receivers may also be placed in the same borehole as the source.

The seismic device, i.e., a source and/or a receiver, is usually suspended from a cable which also conveys from the surface the power to operate the device and to the surface various signals from the seismic device. Source 102 can be any of a plurality of source types including, but not limited to, a vibrator such as disclosed, for example, in U.S. Pat. No. 4,709,362, an electrical hammer source, a small airgun that is impulsive and relatively widebanded, and piezoelectric elements that are swept in frequency in a manner similar to surface vibrators, among others that are known to persons of skill in the art for the purposes described herein.

The signal 104 propagates throughout the formation 112 to a feature of interest such as reservoir 108. While part of signal 104 generally continues to propagate through the point 108, some of the energy will be reflected back towards the receivers 106. This receiver in one embodiment may be a geophone with a high sensitivity to seismic signals. As used herein, the terms "receiver" and "sensor" include any suitable device that is configured for detection of source signals and associated noise for the purposes described herein. The terms "hydrophones" and "geophones/accelerometers" include optical or MEMS devices suitable for detection of source signals and associated noise according to the principles described herein.

A clock measures the time of generation of the seismic signal 104 and the time of receipt of the direct and reflected signal at receiver array 106. Using this time, it is possible to image the feature of interest. The velocity of the signals through the formation may vary depending on the location, and without an accurate velocity profile, it is difficult to create a reliable image of underground features surrounding the borehole.

As depicted in FIG. 1, the feature of interest may be a reservoir 108 into which water or gas is injected via a wellbore 110. In such a situation, it is desirable to monitor the movement of the injected water/gas front into the reservoir 108. By appropriate time lapse acoustic measurements it is possible to determine, for example, the oil replaced by the injected fluid, and location of the remaining oil in the reservoir 108.

Time lapse seismic techniques utilize repeated seismic surveys in the same area with an interval of a few months to a few years to monitor, for example, the production of hydrocarbons from subterranean reservoirs. The replacement of oil by water for example causes small changes in the acoustic velocity in the reservoir, and the changes may be observed by the change in the reflection coefficients. In this, the transit time changes by only a fraction of milliseconds. For example, if a change in transit time is 0.1 milliseconds, this amount corresponds to 0.25 meters/second in an acoustic velocity of 2500 meters/second. To observe such small changes, a source and a receiver have to be placed with an accuracy that is within a fraction of 0.25 meters. It is not practical to repeatedly deploy a downhole tool for such seismic measurements with such accuracy by wireline in a conventional fashion. In addition, it is not certain that the redeployed tool will be oriented in the same direction as it was in the previous deployment.

Such measurements are used to enhance recovery of hydrocarbons from subterranean reservoirs. Such measurements may also be utilized to monitor subterranean reservoirs for purposes of $CO_2$ sequestration and water resources. Appropriate data acquisition and processing instruments 114 may be provided at the surface, or at a remote location, as desirable or necessary.

Figure 2:
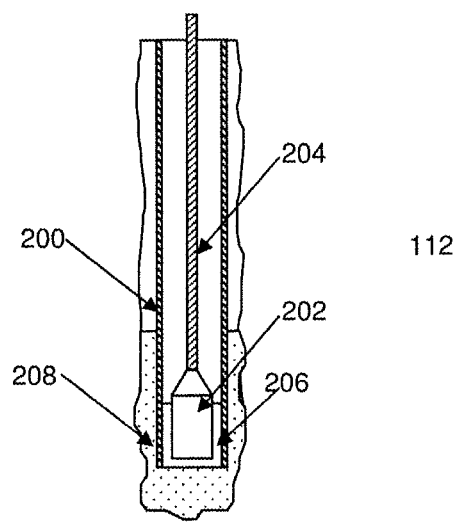
FIG. 2 illustrates schematically one exemplary tool for acoustically monitoring subterranean formations according to the principles described herein.

FIG. 2 shows one possible tool configuration that may be used in the collection of acoustic measurements throughout the borehole according to the principles described herein. One aspect of the device described herein is a seismic tool 202 that is deployed in a cased borehole 200 with a conveyance such as a wireline 204. Cement 208 is filled in the annulus between the casing 200 and the formation 112 to provide stable coupling between the formation and the casing. The seismic tool 202 may be any combination of a seismic source and/or seismic receiver, and is removably retained in a tool locking mechanism or retainer 206 so that good acoustic coupling between the casing and the seismic instrument is established. Two or more tools may be used simultaneously in the same tool string. The present disclosure contemplates application of the principles herein to various areas, such as wireline, permanent monitoring, hydro-fracture monitoring, production logging, among others. In this, the systems disclosed herein may be deployed on land or in the sea.

In FIG. 2, borehole 200 may be a previously drilled well, such as a production well or a monitoring well, with tools 202 that is used to generate and/or sense seismic signals. Although one tool is depicted in FIG. 2, a series of tools may be provided as desirable or necessary. In this, in addition to seismic devices additional measuring devices may be provided in additional tools for purposes of measuring various formation properties such as, for example, resistivity, fluid properties, pressure, temperature, among others that are known to those skilled in the art. The seismic device 202 may be any type of suitable seismic instrumentation for generating and/or receiving the desired signals. The generated signals propagate through the formation 112, and some signals reach sensors 106 (note FIG. 1) having one or more receiving device for detecting the seismic signals. The sensor arrangement and the associated receiving devices may be used as the primary apparatus for collecting the acoustic measurements, as described in greater detail below.

In one embodiment, a suitable cable 204, for example, a wireline, slickline, or other conveyance that is configured for data telemetry, is provided for communication uphole with a controller tool 114 on the surface of the borehole (note again FIG. 1). The analysis tool 114 may be a stand alone, or may be integrated into a field vehicle.

According to the principles described herein, the tool section(s) may be moved through the borehole 200 by a winch (not shown), via a suitable arrangement. A device may be used to record the depth of the section 202. In one embodiment, the section 202 may be lowered to a predetermined depth in the borehole 200 and then the winch pulls the conveyance 204, and thus the section 202, up through the borehole 200.

In some aspects of the present disclosure depicted in FIG. 3A, a vibrator source 302 may be deployed in a well or pit 304 having depth from about 30 m to 100 m so that the source is located below the weathered zone, which can highly attenuate and slow down the transmission of seismic energy into subsurface formations. The seismic system 300 may comprise a hydraulic and/or an electro-mechanical actuation system 306 and a cable system 308 so that the vibrator 302 may be deployed for active permanent or semi-permanent reservoir monitoring. The frequency and force of the source system may be controlled by the controller system 306.

In some embodiments, a seismic device, such as a vibrator or a geophone, has an actuation system, an environment proof cable system, and a controller system. The present disclosure contemplates that in some embodiments the actuator system may operate based on a program provided by the controller system. In some aspects, the seismic system has a mechanical anchoring apparatus to maintain the seismic device in the same position and orientation, and with the same coupling, over repeat VSP surveys. In aspects herein, the locking or retaining system may be permanently installed in a well, for example, by cementing, for purposes of long term monitoring of subterranean formations. It is envisioned that a vibrator actuator system may be designed or configured to vibrate in a desired mode such as a broadband vibration from low to high frequencies.

In one embodiment, the environment proof cable system operates to send controlled electrical power from the controller system to the vibrator actuator system according to a programmed vibration sweep. The controller system operates to generate controlled electrical power for the vibrator actuator system according to the programmed vibration sweep. The function may be performed by the controller system itself or by a separate computer system. The seismic signals recording system may be connected to the controller system to initiate the start of the vibration, or both systems may be synchronized according to GPS time. A reference sensor (not shown) is located at the downhole source to monitor the source signature, and the sensor signal is transmitted to the recorder. The reference signal is used to compute seismic data.

It is envisioned that the aforementioned vibrator actuator system may be deployed in an oil well and/or a pit below the weathered zone or the highly attenuating formations near the surface. In this, the energy generated by the vibrator has an ideal spherical divergence and can be transmitted to the subsurface structures without massive energy loss and distortions. Furthermore, the buried vibrator may be installed in the oil well and/or pit using different methods to function as a permanent or semi-permanent seismic source. Methods of installation disclosed herein provide an ideal acoustic coupling between the vibrator and the borehole formations.

As previously described, a conventional surface vibrator provides seismic energy at the surface so as to transmit a programmed seismic energy or seismic sweep into the subsurface for seismic surveying. However, most of the energy that is generated on the surface is converted to undesired ground roll, and less energy is transmitted to the earth structure. Due to the weathered zone near the surface the generated seismic energy is highly attenuated, in particular, the high frequency energy. In consequence, a conventional vibrator has to generate a huge amount of force using an electrically controlled hydraulic system. In addition, there is significant distortion of the seismic energy by surface condition with the distortion increasing when vibrating at the same place i.e., the same base plate position, for a long period of time. A conventional vibrator requires a large truck making it unsuitable as a permanent seismic source. The acoustic waves generated on the surface have to travel through the low velocity weathered zone and this causes significant delay in the travel time, which causes ambiguities in interpretation of the data. In contrast, downhole vibrators of the type proposed herein may be deployed below the weathered zone to transmit the desired seismic energy to subsurface formations without a major loss in energy and distortions by the weathered zone and the surface terrain.

Downhole vibrators, such as the type described above, may be used as seismic sources at transition zones, such as a swamp or shallow water, since heavy surface vibrators are unable to effectively operate in transition zones.

In some aspects herein, the vibrator may be installed in a well by cementing to operate as a seismic source. In this, cementing provides ideal acoustic coupling between the vibrator and subsurface formations. It is envisioned that the actuator system may be installed using several methods. For example, the vibrator may be latched inside a cemented well and/or pit so as to be retrievable.

The seismic signal recorded by a seismic sensor represents the actual vibration generated by the vibrator so that the signal can be used for more accurate vibrator control using a feedback method and/or for cross correlation purposes with the seismic signals recorded by geophone(s) either at the surface or in the borehole or by simultaneously recording at both locations. The same signal may be used for quality control (QC) purposes by comparison with a pilot sweep that is generated by the controller system. Vibration delay and vibration phase may be monitored in real time. The seismic sensor may be an accelerometer, a geophone and/or a hydrophone. However, a hydrophone would require water/fluid in the well and/or pit, and would need to be lowered from the surface at least for a few meters. A monitoring sensor may be provided on top of the actuator assembly or as a separate sensor in the well and/or pit.

FIG. 3A is a schematic representation of one possible configuration for seismic data acquisition according to the present disclosure. In FIG. 3A, a vibrator 302 deployed in a borehole 304 has a controller system 306 comprising a controller PC 310; a controller interface 312; and a power inverter 314. The controller PC 310 is programmed to initiate a required vibration sweep of the vibrator including frequency contents, force, duration, linearity, taper and modulation for a low signal to noise (SN) ratio. The controller PC issues a vibration start command to start the vibrator at a programmed timing in a master mode, and monitors real-time QC of the actual signal and the system health during the production period. The PC can also receive the start command from the seismic signal recording system through a timing signal cable 316 and/or a radio modem 318 in a slave mode. The system clock of the controller PC 310 can be automatically synchronized to a GPS clock 320 when a GPS receiver is connected to the system 300. The controller interface 312 has an interface to the controller PC 310, the power inverter 314, the GPS receiver 320, the signal cable 316 from the seismic signal recording system, and the radio modem system 318. The controller system also provides a fail-safe system in case of any malfunction of the seismic system such as an electrical failure.

The downhole source 302 may be deployed in the borehole 304 using conventional techniques. For example, a centralizer/packer (shown as a dark ring around the downhole source 302) may be used to position the source 302 in the borehole 304. In this, the source 302 may have a single centralizer/packer located, for example, in the middle of the source as depicted in the exemplary embodiment of FIG. 3A, or may have a dual centralizer/packer assembly located, for example, at the top and bottom areas of the source 302. The centralizer/packer assembly is configured or designed to set the downhole source 302 in the well so that the source is able to provide stable and repeatable source signatures. Since centralizer/packer assemblies are known to those skilled in the art, they are not described in detail in the present disclosure. For example, centralizer/packers such as used with Schlumberger's Modular Formation Dynamics Tester (MDT) tool and/or Schlumberger's Mechanical Plug Back Tool (MPBT) may be used for deploying and securing the downhole source according to the present disclosure.

The power inverter 314 is a power supply to the vibrator actuator that is accurately controlled with respect to frequency. The power inverter generates the required power according to a programmed sweep commanded by the controller PC 310. The target controlled frequency range is from about 10 to about 500 Hz and can be optimized according to the type of the survey and the survey environment. The power inverter also has an electrical feedback system to accurately control the vibrator actuator.

Figure 3B:
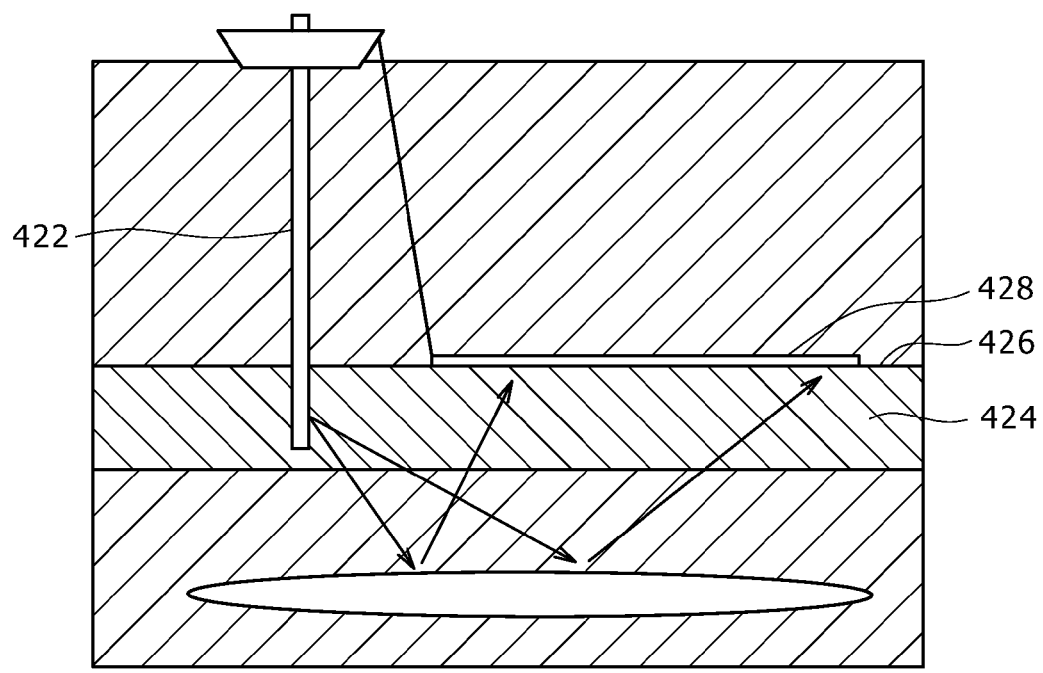
Figure 3C:
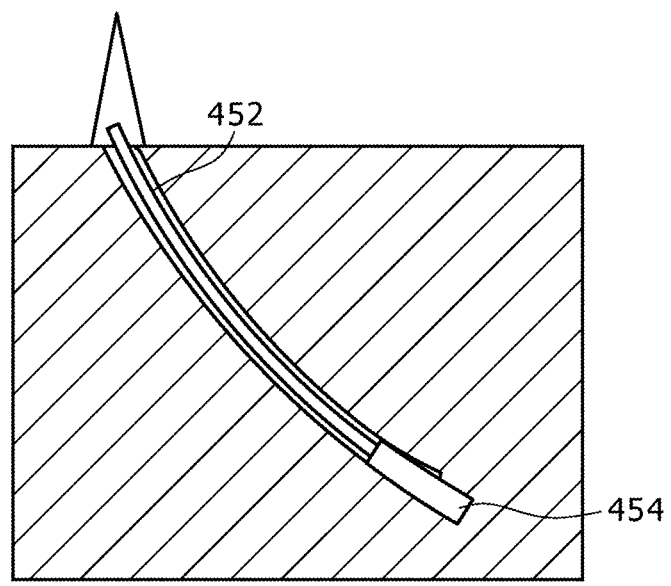

FIGS. 3B and 3C depict some additional exemplary techniques for deploying seismic devices, such as seismic sources and/or receivers, in a borehole according to the principles described herein.

In FIG. 3B, a seismic tool is deployed in, for example, a drillpipe 422 that traverses subterranean formations 424 under a seabed 426. A seabed cable 428 having seismic devices, such as seismic sources or seismic sensors, is deployed at the seabed 426. Typically, it is not possible to generate shear-waves in the sea since mud at the sea bottom may be too soft to support a vibrator that is placed on the seabed to generate shear-waves in the subterranean formations. Therefore, a pipe, such as the drillpipe 422, may be inserted into the mud and a suitable seismic source conveyed into the pipe to lock it at the bottom of the pipe. The seismic source may be activated to generate shear-waves.

Furthermore, even with a hard sea bottom a vibrator may be too light because of sea water buoyancy. Therefore, it may be preferable to drill a hole in the sea bottom and to set the seismic source in a locking mechanism at the bottom of drillpipe. The shear-wave signals may be recorded by using geophones in an ocean bottom cable, or compressional-waves converted from shear-waves may be recorded using conventional streamer cables.

FIG. 3C depicts seismic sources deployed in a borehole with a drillpipe 452 having a bottom hole assembly 454. A latching or retaining mechanism may be included in the drillstring above the drillbit. A seismic device may be lowered and locked in the drillstring to generate seismic measurements. In a highly deviated hole, the seismic device may be pushed down by mud pressure to go into the borehole and to lock with the retaining mechanism. Such an arrangement would replace deploying the seismic device with wireline. The aforementioned technique may be utilized with a seismic source or a seismic receiver.

Figure 4A:
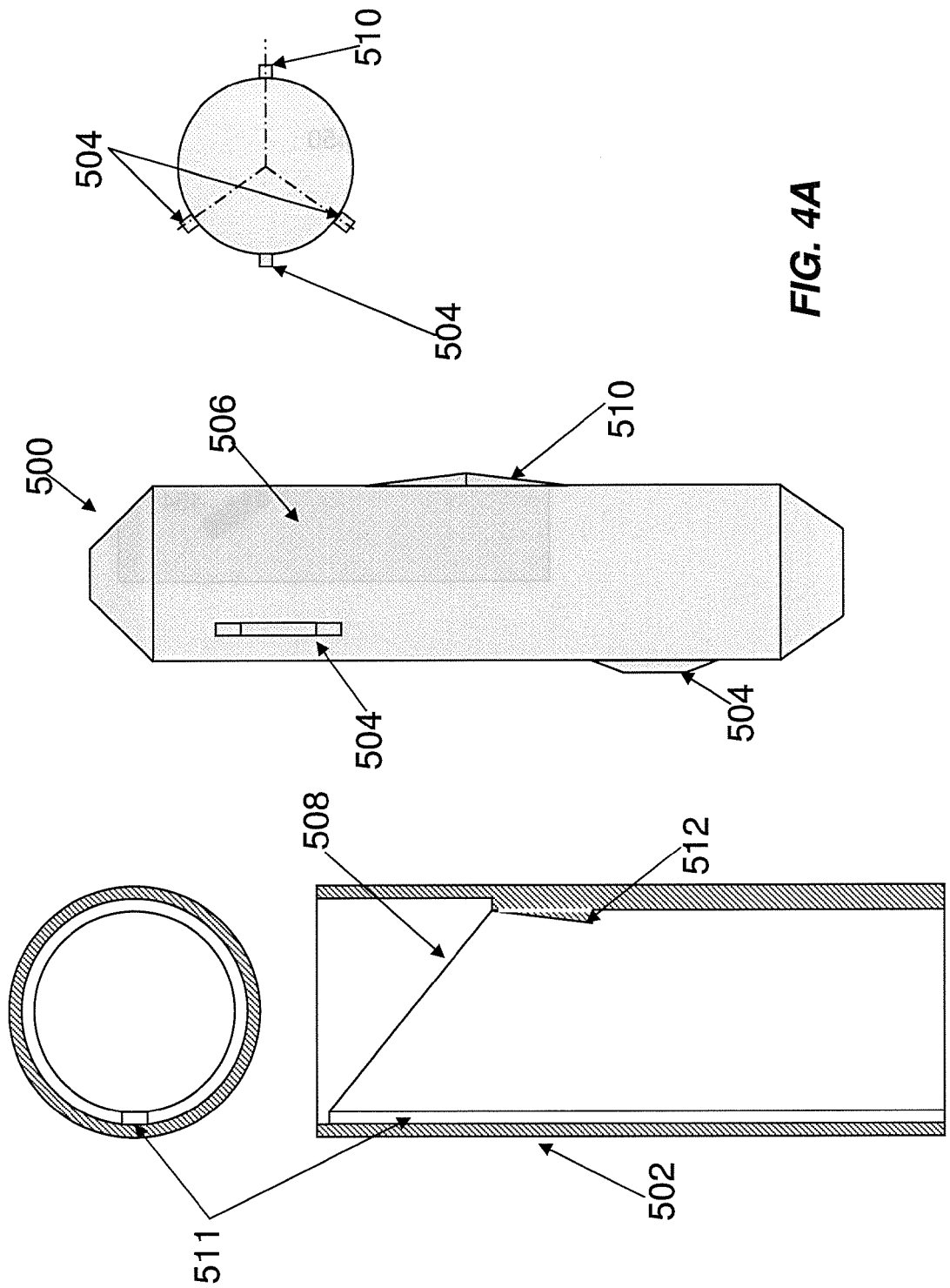
FIGS. 4A and 4B show perspective views of an acoustic tool with a seismic mechanism and a tool retainer according to one embodiment of the principles described herein.
Figure 4B:
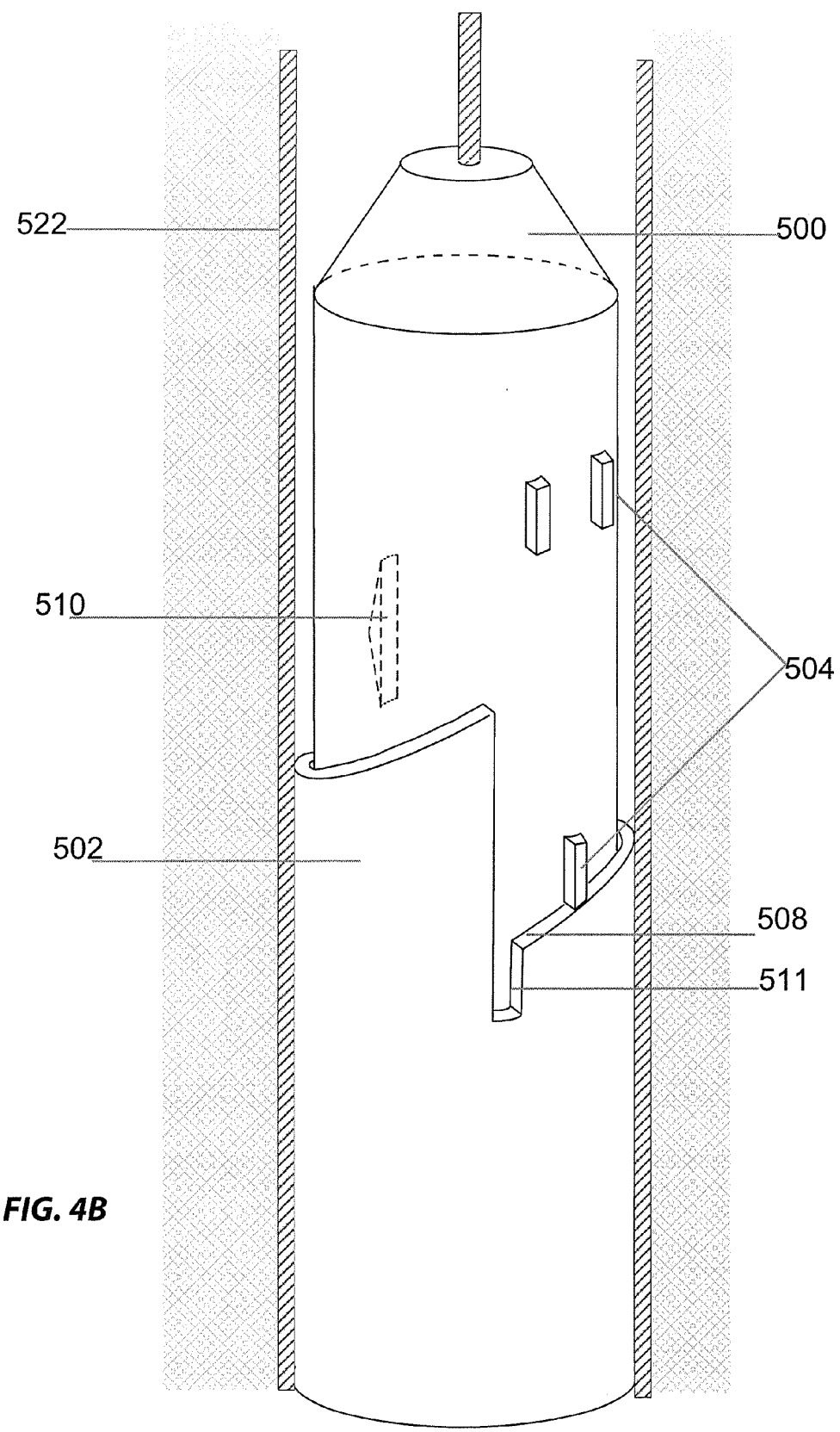

FIGS. 4A and 4B show perspective views of a seismic tool 500 having, for example, combinations of seismic source devices and/or seismic sensor devices mounted thereon, and a tool retainer 502 that is configured or designed for deployment in a borehole as previously described. The tool retainer or locking mechanism 502 is designed so that tool 500 can be removably locked into the tool retainer in a manner that the location and orientation of the tool 500, and the coupling to the borehole, is the same for multiple deployments of the tool 500 in the borehole.

FIG. 4C shows operation of the seismic tool 500 and the tool retainer 502 according to the principles described herein. As the tool 500 is conveyed into the borehole one or more standoffs 504 (three are shown in the exemplary embodiment of FIG. 4A) that are located on an outer housing 506 of the tool 500 are brought into contact with a spiral slide 508 of the tool retainer 502. As a consequence, the tool 500 is rotated (as depicted in the first three drawings of FIG. 4C) so that a lower one of the standoffs 504 is aligned with a groove 511 of the tool retainer 502. Note the fourth drawing in FIG. 4C. In addition, a tapered projection 510 located on the tool housing 506 is aligned with a wedge 512 that projects from an inner wall of the tool retainer 502. Further advancement of the tool 500 into the borehole causes the lower standoff 504 to enter the tool retainer groove 511 so that the tool 500 is locked into place in the tool retainer 502. Note the fifth drawing in FIG. 4C. The tool projection 510 contacts the wedge 512 so that tight contact is established between the tool standoffs 504 and the tool retainer 502 for acoustic coupling with the borehole.

As previously mentioned above, the tool retainer may be cemented at the bottom of the borehole casing so that acoustic coupling is established with the borehole. Also, the housing of the tool may be designed so that the tool slips easily into the tool retainer without the possibility of jamming.

Figure 4D:
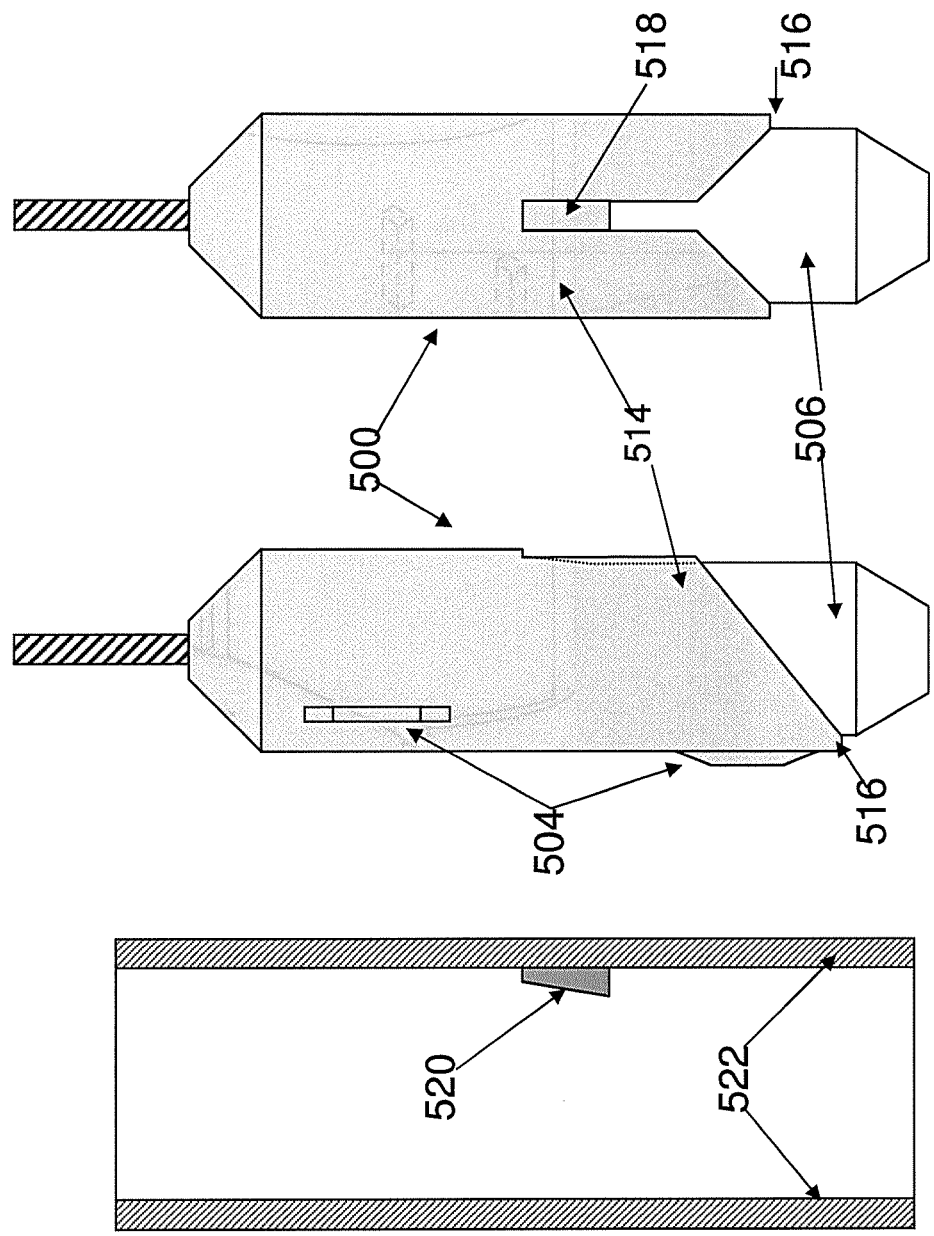
FIGS. 4D and 4E show perspective views of an acoustic tool with a seismic mechanism and a tool retainer according to another embodiment of the principles described herein.
Figure 4E:
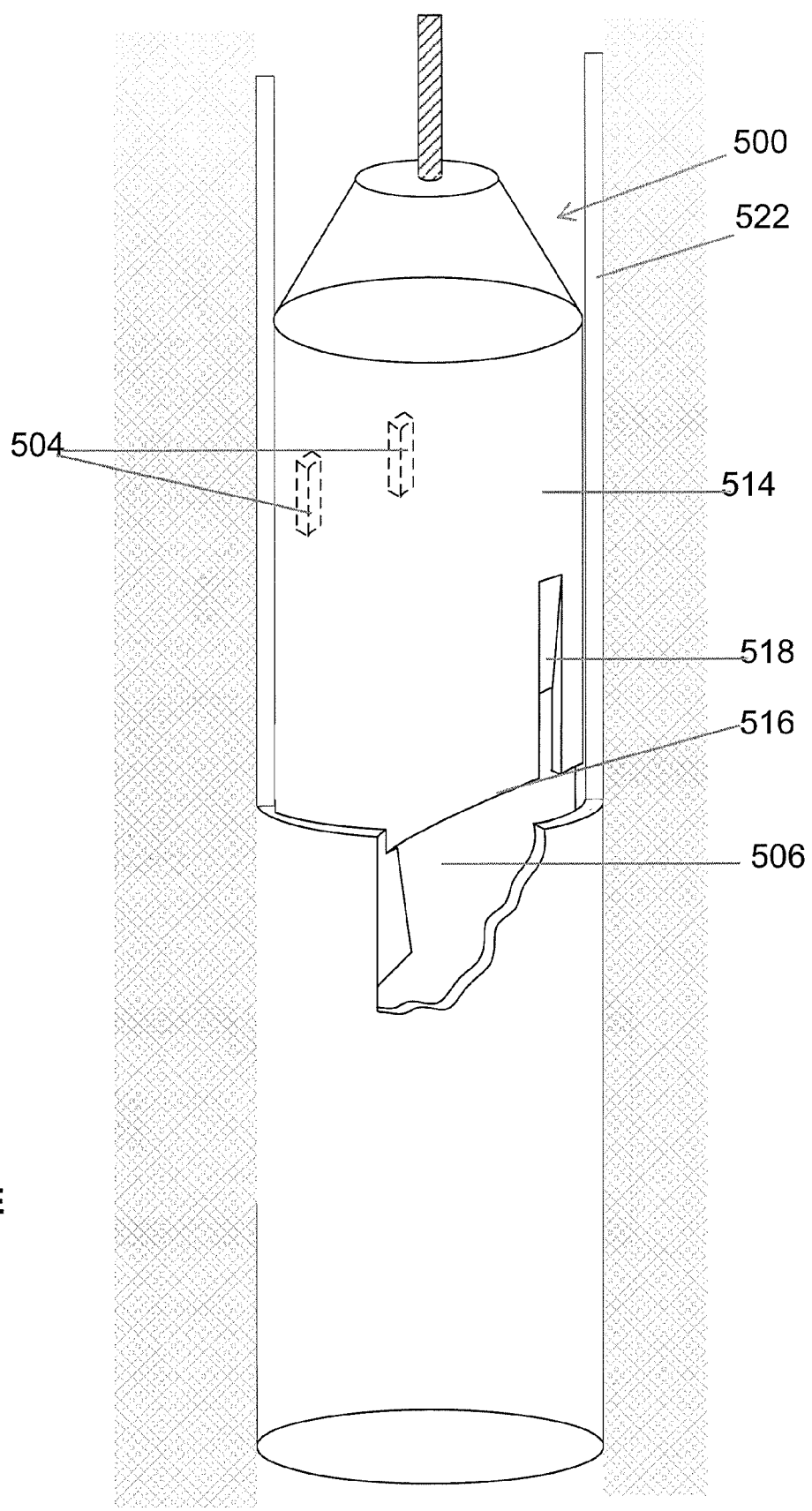
Figure 4F:
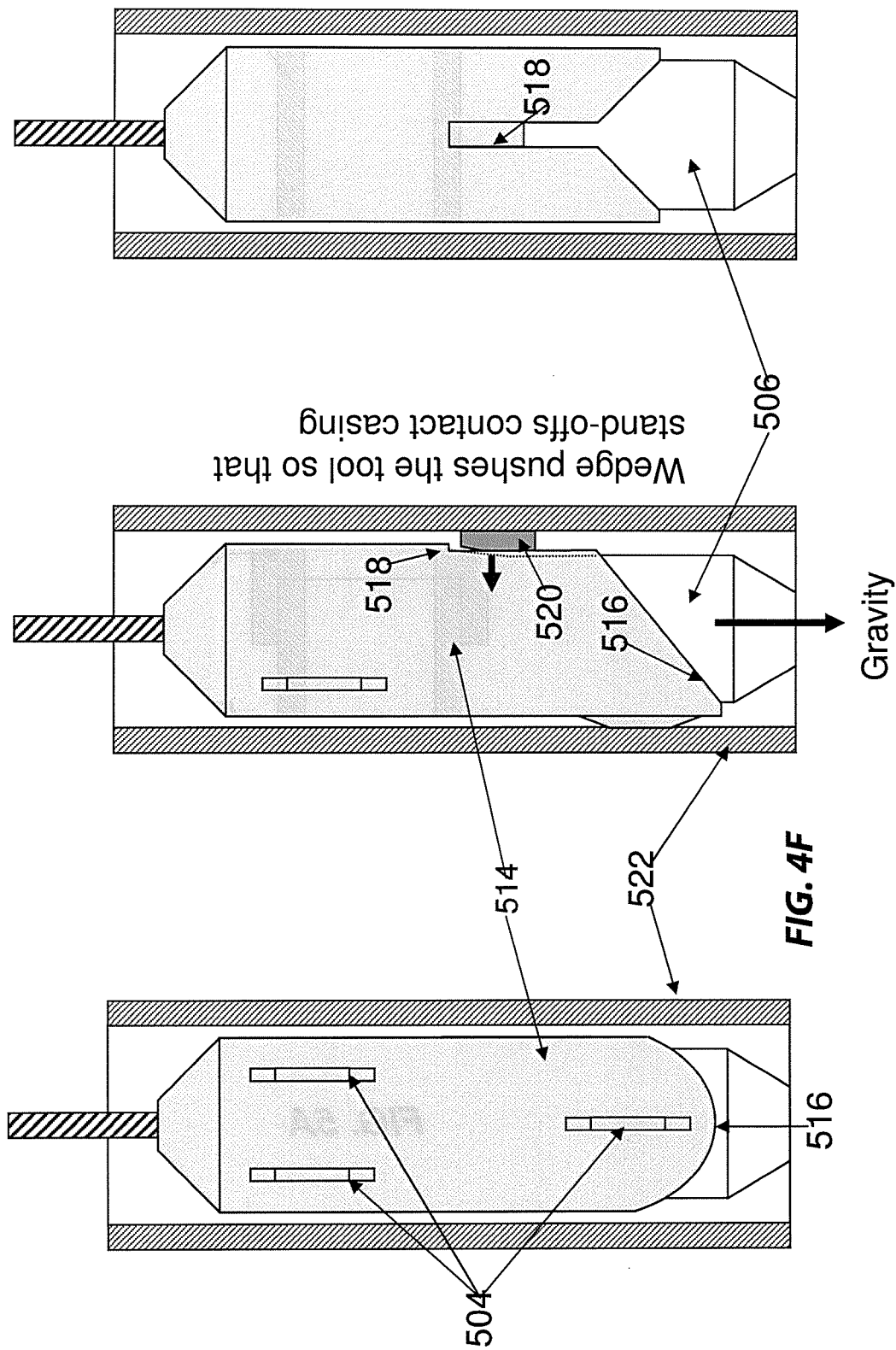
FIG. 4F is a depiction of the deployment of an acoustic tool in a tool retainer according to another embodiment of the principles described herein.

FIGS. 4D to 4F show another possible embodiment of the seismic tool and the tool retainer. In the present embodiment, a tool jacket 514 encases the outer housing 506 of the tool 500 and, in addition to the tool standoffs 504, a bidirectional slide 516 and groove 518 are structured and arranged on the tool jacket 514. In contrast with the embodiment of FIG. 4A, in the present embodiment the tool retainer is a triangular shaped projection 520 that is attached to an inner wall of the borehole casing 522 in a manner that the tool retainer 520 is acoustically coupled with the borehole. The projection 520 of the borehole casing 522 is configured or designed so that it coacts with a wedge shaped surface of the groove 518 of the tool jacket 514 so that the elements are locked together by gravity force acting on the tool 500 to force or push the tool standoffs 504 against the borehole casing wall for securing and coupling the tool to the borehole.

As the seismic tool 500 is conveyed into the borehole the standoffs 504 position the tool 500 in the borehole so that the tool retainer projection 520 contacts the bidirectional slide 516 causing the tool 500 to rotate in the borehole so that the tool retainer projection 520 is aligned with the groove 518 in the tool outer jacket 514. Since the slide 516 is bidirectional the tool 500 will rotate in the clockwise or counterclockwise direction depending on where contact is made with the tool retainer projection 520. Once aligned, the tool retainer projection 520 locks into the wedge shaped tool jacket groove 518 so that the tool 500 is located and oriented, and acoustically coupled to the borehole. As previously mentioned, the tool retainer projection 520 and the tool jacket groove 518 have corresponding contact surfaces that are tapered so that as the tool retainer projection 520 fits into the tool jacket groove 518 the tool 500 is pushed as indicated by the arrow in FIG. 4F so that the standoffs 504 are in contact with the casing 522 and the tool is acoustically coupled with the borehole. In the embodiments of FIGS. 4A to 4F, surface activation is not required to deploy the seismic devices, i.e., the deployment is self-activating as the tool or tools are lowered in the borehole. As the tools descend in a borehole, the tools are oriented, and are anchored by the force of gravity with the support of the slides and the wedges.

In the preceding description, a plurality of standoffs have been described. However, the present applicants have recognized that a configuration of three standoffs arranged in a triangular configuration with the apex pointing downward would provide secure coupling and support to the acoustic tool in the borehole. In this, various prior techniques for securing tools in a borehole are susceptible to loosening due to thermal changes and/or due to vibration. Since secure positioning and acoustic coupling are important for acoustic measurements in a borehole, the present arrangements of three standoffs in combination with other co-engaging elements described herein provide the desired results. Furthermore, the preceding embodiments do not need any activation of the locking mechanisms from the top of the borehole. The acoustic tool is deployed by gravity using an appropriate conveyance so that the tool is lowered into the borehole and oriented by, for example, a spiral slide to self-lock into the retaining mechanism in the borehole. A wedge type element engages a corresponding action point so that through the action of gravity the wedge and the corresponding element are tightly engaged thereby pushing the tool into tight contact with the borehole casing. In retrieving the acoustic tool, by pulling on the conveyance the deployment process is reversed and the tool is disengaged from the retaining mechanism in the borehole.

Figure 5A:
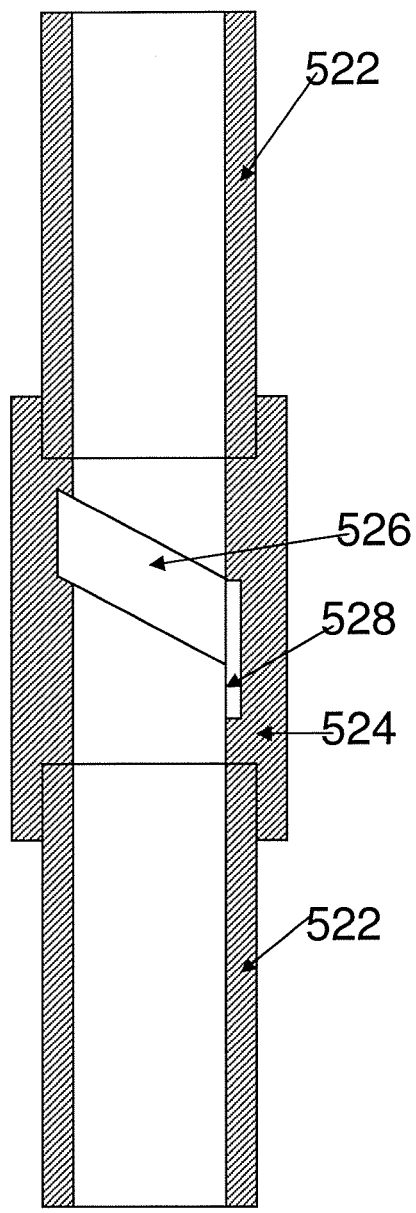
FIG. 5A is a schematic representation of a borehole casing and a casing joint with a tool retainer according to yet another embodiment of the principles described herein.
Figure 5B:
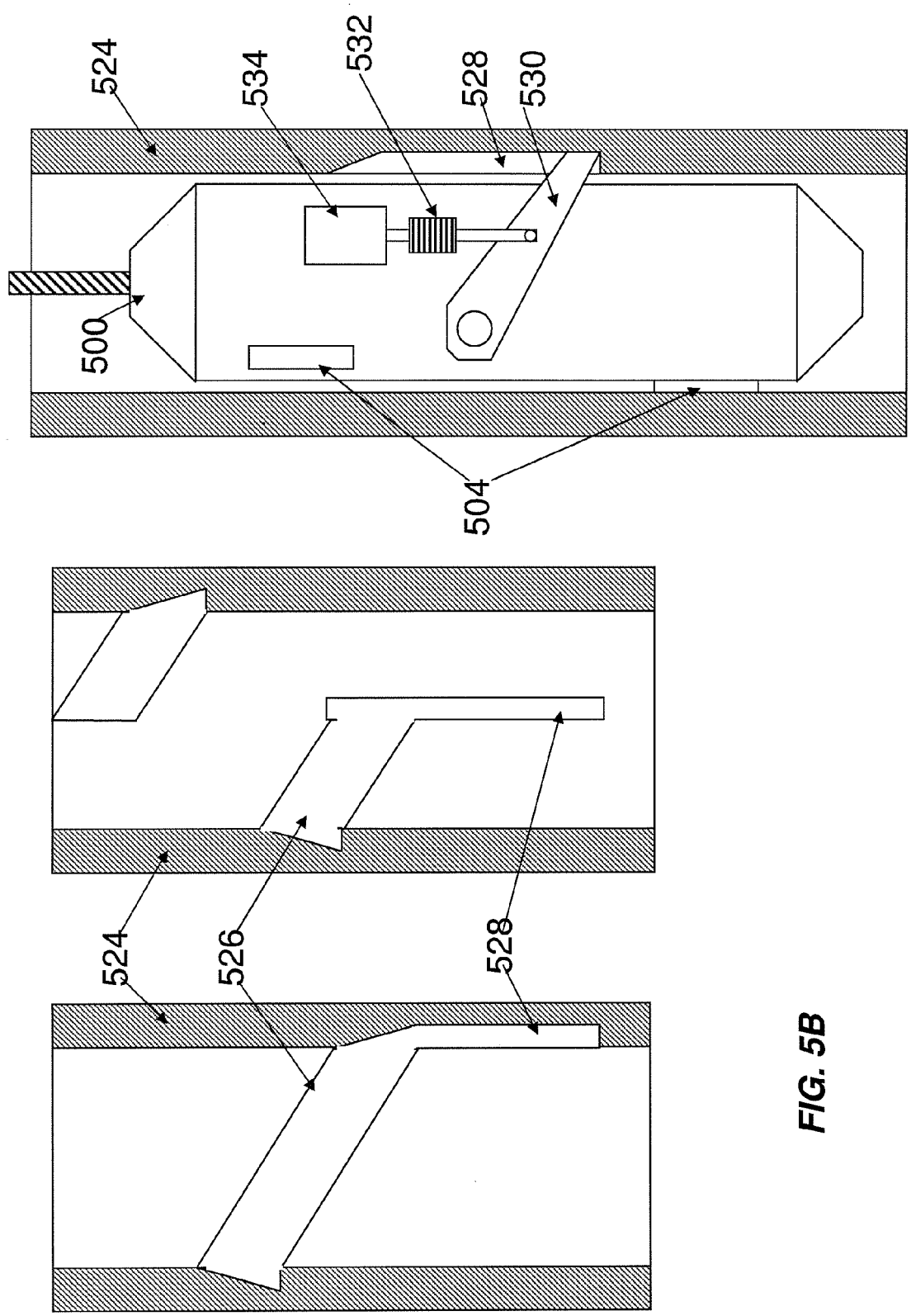
FIG. 5B is a schematic depiction of the deployment of an acoustic tool in a borehole casing joint with a tool retainer according to another embodiment of the principles described herein.

FIG. 5A is a schematic representation of a borehole casing 522 and a casing joint 524 with a tool retainer according to yet another embodiment of the principles described herein. FIG. 5B is a schematic depiction of the deployment of an acoustic tool 500 in a borehole casing joint 524 with a tool retainer according to another embodiment of the principles described herein. As depicted in FIGS. 5A and 5B, the casing joint 524 is designed to removably retain the acoustic tool 500 by locking the tool to the borehole. The casing joint 524 has a spiral slide 526 and an associated locking groove 528 that are located on an inner surface of the casing joint 524. For example, the casing joint may be machined to prepare the slide and groove configuration for removably retaining the acoustic tool. The specially configured casing joints may be deployed in a borehole casing at appropriate locations at which the acoustic tools are to be located for acoustic measurements so that the acoustic tools may be repeatedly deployed at the same location, and with the same orientation and acoustic coupling with the borehole.

As depicted in FIG. 5B, the acoustic tool 500 is configured with a locking arm 530 on the outer housing of the acoustic tool 500. The locking arm 530 is extendible with, for example, a spring 532 and actuator 534 mechanism that extends and retracts the locking arm 530. It is noted that locking groove 528 has a sloping top surface so that the locking arm 530 can be extracted from the groove 528 when the tool 500 is retrieved from the tool retainer by pulling it upward in the borehole. Note FIG. 5B. The locking arm 530 may be activated from the surface using any suitable activation technique such as by wire connection, hydraulic connection and/or annulus pressure change using rupture disks. Such techniques are well known to those skilled in the art.

In the tool deployment that is depicted in FIG. 5B, the acoustic tool 500 is lowered into the borehole till it reaches the target depth at which the specially designed casing joint 524 is located. At just above the target depth, the locking arm 530 is activated by, for example, surface activation of the spring 532 and actuator 534 mechanism. Since the locking arm 530 is spring loaded, the arm 530 slides down the casing 522 (note FIG. 5A) as it descends in the casing 522. The locking arm 530 opens to its extended position when it reaches the spiral slide 526 in the casing joint 524. The locking arm 530 enters the slide 526 and the tool 500 is turned to the desired orientation. When the locking arm 530 reaches the alignment part of the groove 528, the tool 500 goes down vertically until the locking arm 530 reaches the bottom of the locking groove 528. The force of gravity pushes the locking arm 530 in the upward direction and the force acts to further open the arm 530 to lock the tool 500 to the casing wall. In this, secure contact is maintained via the standoffs 504. Note again FIG. 5B.

Figure 5C:
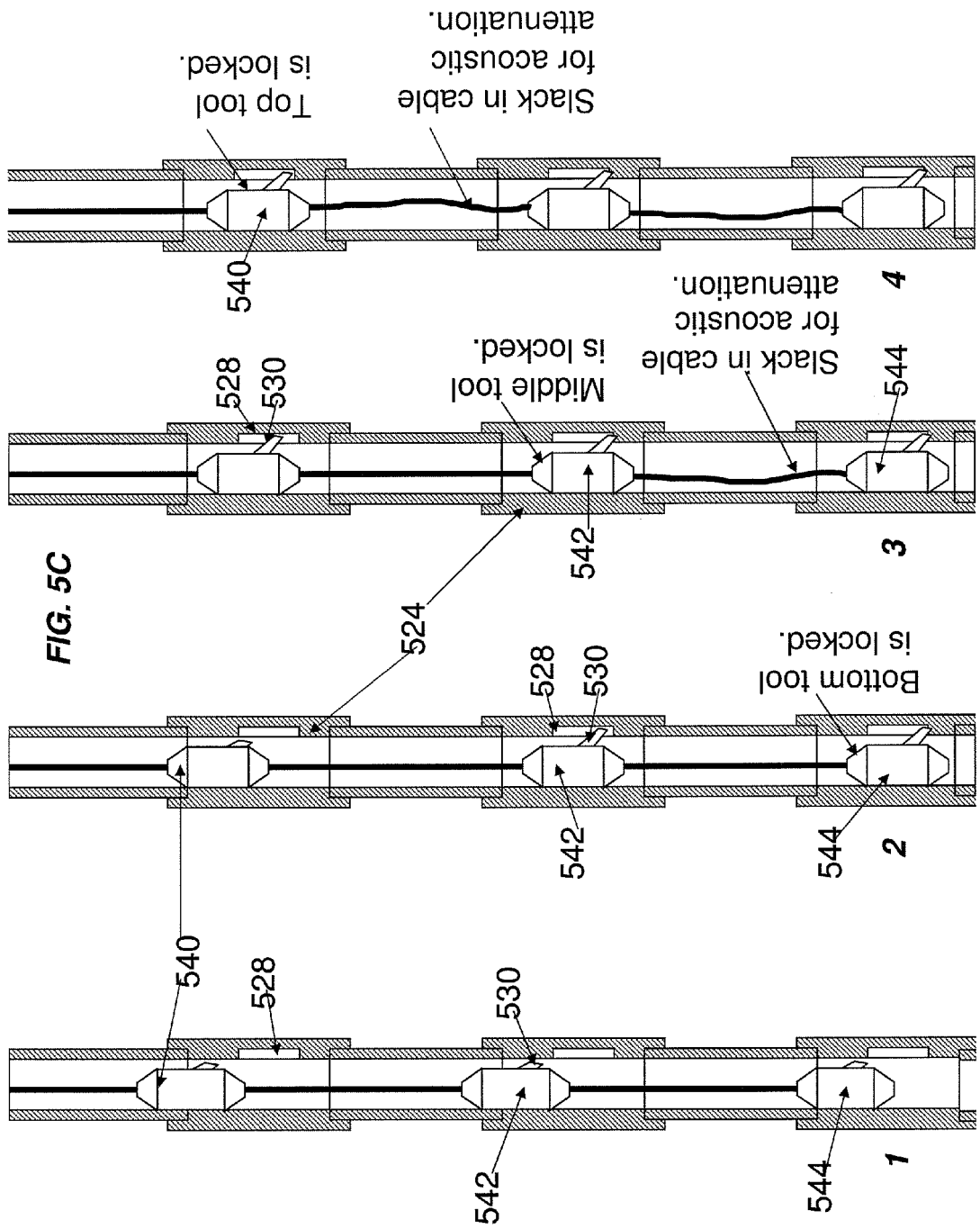
FIG. 5C is a step-by-step depiction of the deployment of an acoustic tool array in a borehole according to yet another embodiment of the principles described herein.

FIG. 5C is a step-by-step depiction of the deployment of an acoustic tool array 540, 542, 544 in a borehole according to yet another embodiment of the principles described herein. Each tool 540, 542, 544 in the array is configured as described above in connection with FIGS. 5A and 5B, and has a corresponding casing joint 524 of the casing 522, which also is configured as previously described above. The tools 540, 542, 544 of the acoustic tool array are deployed as previously described above in connection with FIG. 5B.

The cable separation between adjacent tools in the array is slightly, for example 5%, longer than the separation of the designated casing joints so that there is slack in the excess cable to prevent acoustic noise propagation along the cable. In addition, the longer cable between adjacent tools is needed to avoid the uppermost tool getting into the groove of the top casing joint that is designated for it while the lower tools are unable to reach the designated casing joint grooves due to insufficient cable length.

The locking arms 530 of the tools 540, 542, 544 are maintained in a closed position while the tool array is running in the hole. Then, the locking arms 530 are opened by, for example, an appropriate command from the surface when the tools 540, 542, 544 are situated just above their designated grooves 528 of the casing joints 524 so that each tool 540, 542, 544 is locked into its designated groove 528. With this arrangement, the bottom tool 544 is prevented from getting into the uppermost groove 528 which is designated for the tool 540.

Figure 5D:
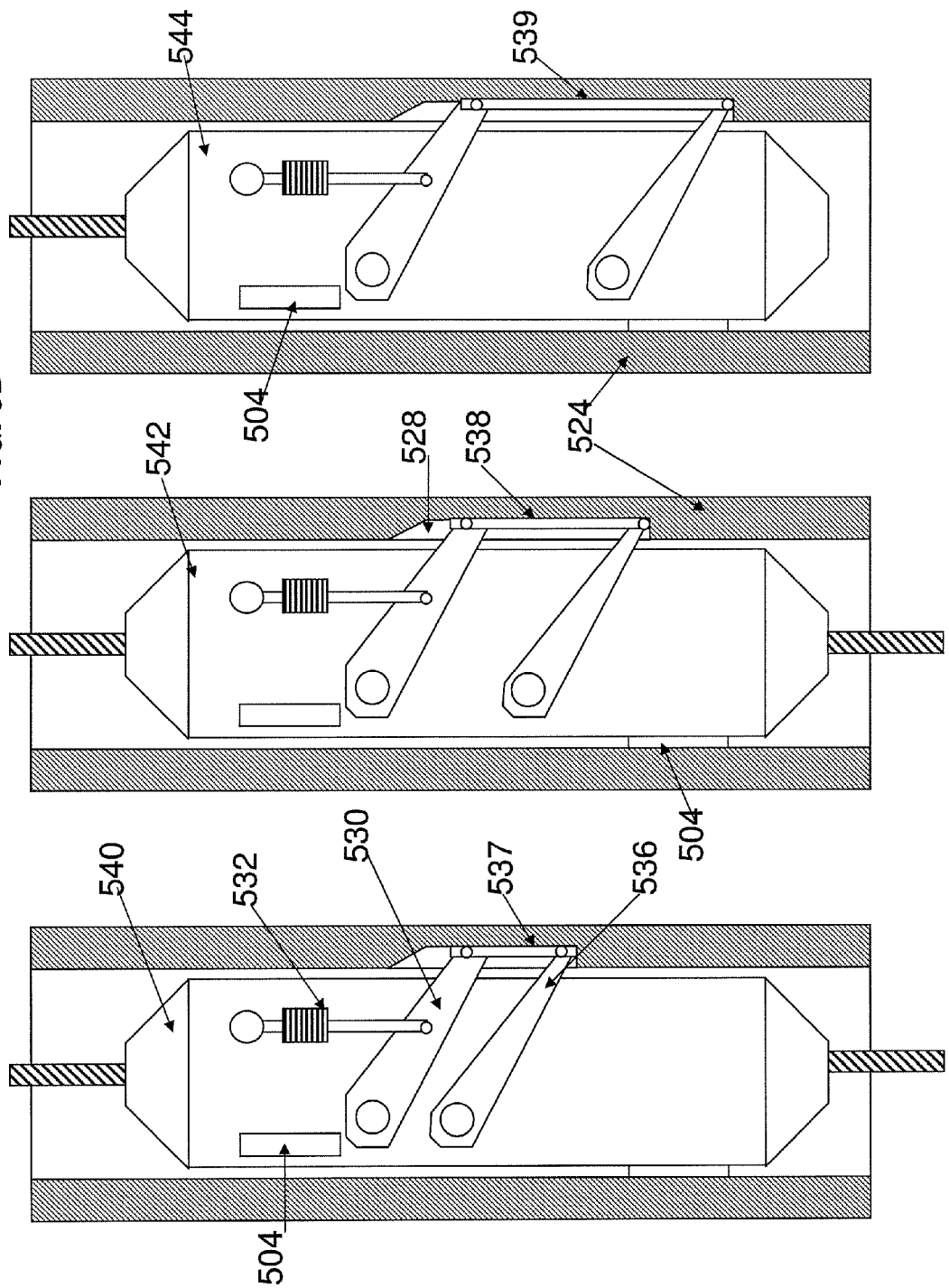
FIG. 5D is a schematic depiction of the deployment of three levels of acoustic tools in an acoustic tool array in corresponding borehole casing joints with tool retainers according to another embodiment of the principles described herein.
Figure 5E:
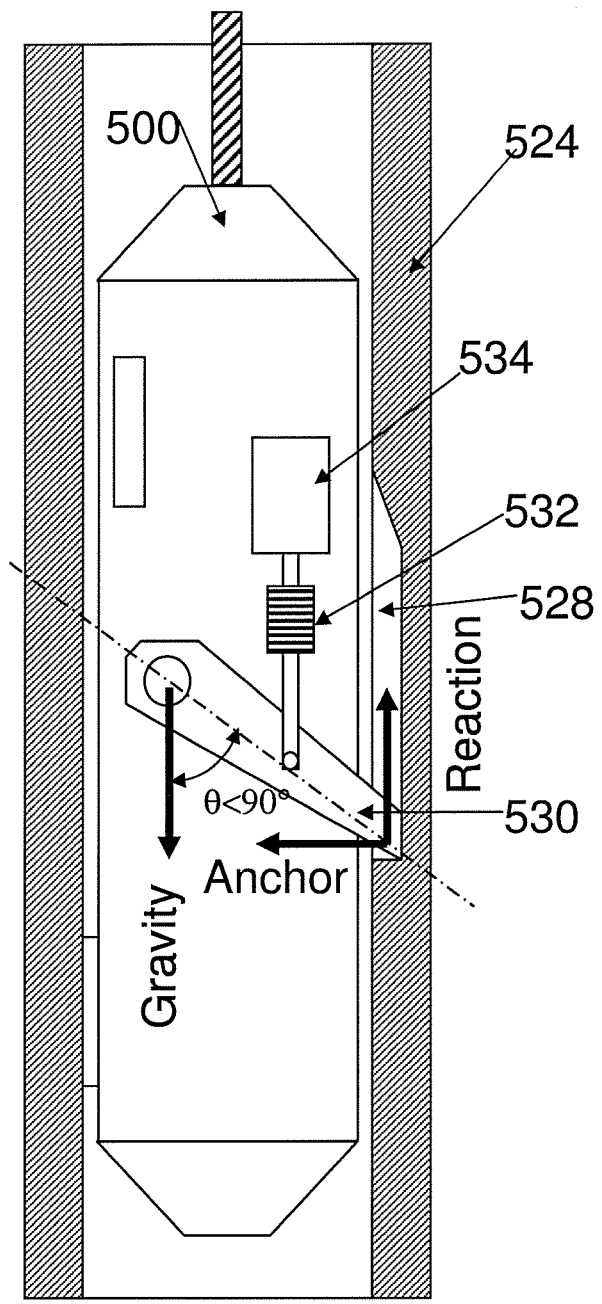
FIG. 5E is a schematic depiction of the interaction between the locking elements in the deployment of an acoustic tool in a corresponding borehole casing joint with a tool retainer according to one embodiment of the principles described herein.

Referring also to FIGS. 5B and 5E, after a locking arm 530 is situated on the bottom of its designated groove 528, the force of gravity pushed the associated tool 500, 540, 542, 544 down, and the locking arm 530 operates to push the tool 500, 540, 542, 544 to the casing wall to lock thereto. Note FIGS. 5B and 5E. In this, the locking force of the locking arm 530 is determined by the angle of the locking arm 530 and gravity. Note FIG. 5E. As indicated in FIG. 5E, the angle of the locking arm θ may be selected so as to be less than 90 degrees.

When retrieving the tools by pulling the conveyance out of the borehole, the tools are moved up and the locking arms 530 are pulled out from their designated grooves 528 by the angle of the arms 530. Although some exemplary embodiments depicted in FIGS. 5B, 5D, and 5E show the groove 528 with a tapered top surface, a taper may not be needed since the locking arm has an angular surface. FIG. 5D depicts another method of anchoring each acoustic tool 540, 542, 544 of the acoustic array in FIG. 5C in its designated casing joint 524. Although FIG. 5D depicts the deployment of three levels of acoustic tools 540, 542, 544 in an acoustic tool array in corresponding borehole casing joints 524 with tool retainers, it is contemplated by the present disclosure that any number of tools may be deployed according to the principles described herein, as desirable or necessary.

As depicted in FIG. 5D, each tool 540, 542, 544 of the tool array has, in addition to a spring-actuated locking arm 530, an additional support arm 536 that supports a corresponding, sized clamping pad 537, 538, 539. Each clamping pad 537, 538, 539 corresponds to one of the tools 540, 542, 544 of the tool array and is sized so that the lower tool 544 has a longer pad 539 and the upper tool 540 has a shorter pad 537. Similarly, each locking groove 528 is sized to correspond with the clamping pad 537, 538, 539 of the tools 540, 542, 544 of the tool array that is intended to lock into the groove. Note again FIG. 5D.

The length of the arm clamping pads 537, 538, 539 of the tools 540, 542, 544 and groove 528 lengths are chosen so that a pad 537, 538, 539 can only fit into the target groove 528, i.e., the top pad 537 is the shortest, the middle pad 538 is intermediate size, and the bottom pad 539 is the longest. In this, as the tools 540, 542, 544 of the tool array descend, with corresponding locking arms 530 opened by spring actuation, the uppermost and intermediate casing joints 524 have the shorter grooves 528 while the lowermost tool 544 has the longest pad 539 so that the pad 539 of the tool 544 is unable to settle into the grooves 528 of the uppermost and intermediate casing joints 524. The pad 539 is able to enter only the longest groove 528 of the lowermost casing joint 524 and so on for the other tools 540, 542 of the tool array. As previously described above, with the present configuration the tool array may be deployed without activation from the surface.

Although different size arm clamping pads 537, 538, 539 of the tools 540, 542, 544 have been described above to ensure that the locking arms 530 lock into the designated grooves 528, the present disclosure contemplates other mechanisms and techniques for accomplishing the same result. For example, a key arrangement might be used to ensure that the correct locking arm 530 locks into the designated groove 528. Moreover, the locking arms 530 also could be maintained in the retracted positions till such time that the correct tool 540, 542, 544 is situated just above its designated groove 528, and then the locking arms 530 could be extended to fit into their designated grooves.

Furthermore, as depicted in FIG. 5C, the present configuration provides for conveyance cable slack between adjacent tools 540, 542, 544 of the tool array. For example, conveyance cable length may be 5% longer than the distance separating adjacent casing joints 524. In this, cable slack is provided to make sure that there is enough length of cable so that all the tools 540, 542, 544 sit on bottom of their designated grooves 528 and the tools are anchored, and to prevent noise propagation through the conveyance cable under tension. The present configuration provides for cable slack to attenuate noise in the wireline deployment of an array of acoustic tools.

Figure 6:
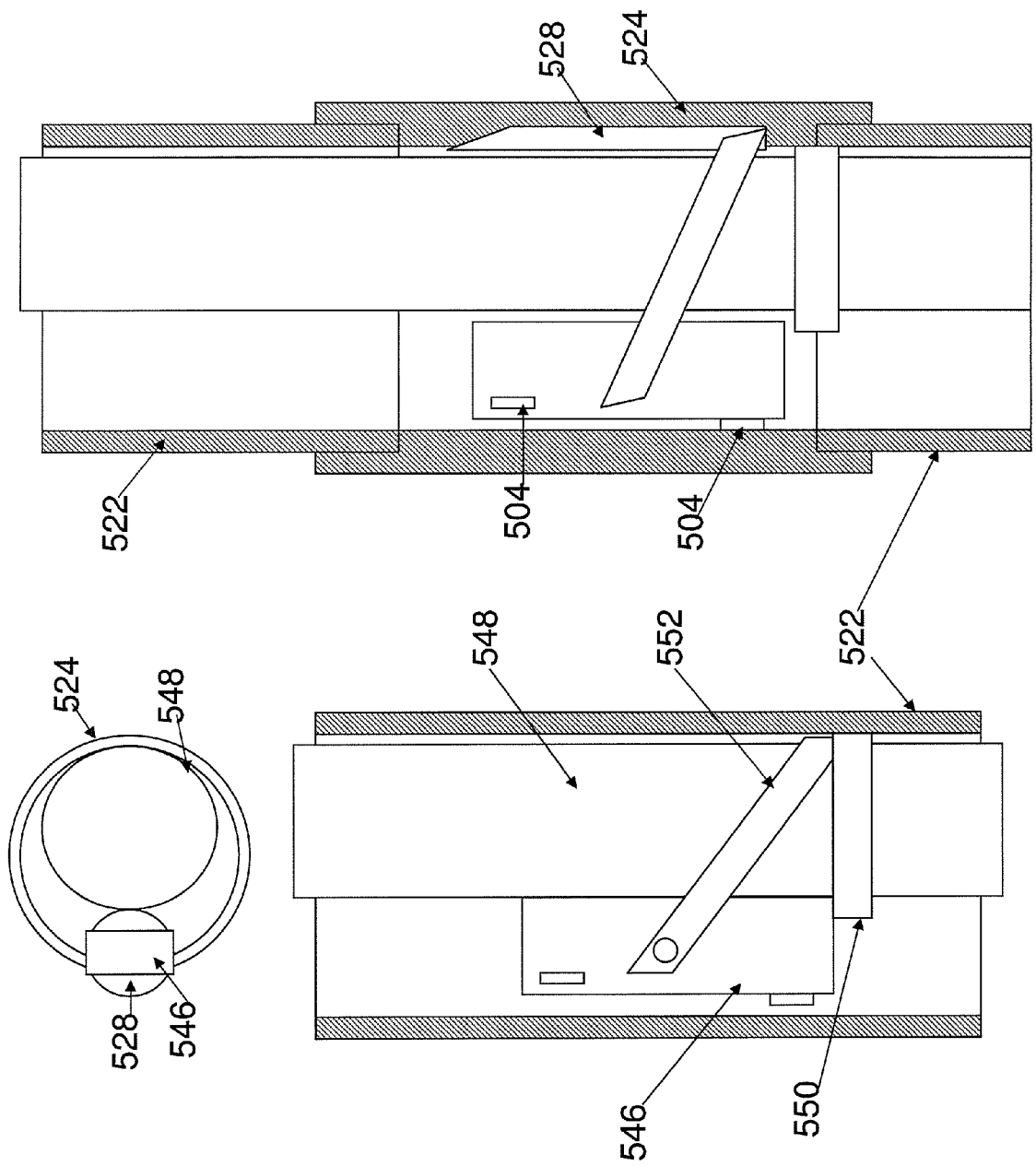
FIG. 6 depicts the deployment of an acoustic tool in a borehole tool retainer according to yet another embodiment of the principles described herein.

FIG. 6 depicts the deployment of an acoustic tool in a borehole tool retainer according to yet another embodiment of the principles described herein. In FIG. 6, tubing 548, such as production tubing, is used as conveyance for deploying an acoustic tool 546 in a borehole casing 522. A cradle 550 is attached to the tubing 548 to removably retain the tool 546 for deployment according to the principles described herein. As previously described above, casing joint 524 is provided with, for example, a spiral slide and locking groove 528 configuration to removably retain the acoustic tool 546 at a predetermined location and orientation, and acoustically coupled with the borehole. The acoustic tool 546 has a locking arm mechanism 552 that is similar to the locking arm mechanisms described above. The cradle 550 attached to the tubing 548 securely conveys the acoustic tool 546 while the tool is descending into the borehole.

After the tool 546 is securely locked into the locking groove 528 of the casing joint 524, the tubing 548 is further lowered so that the cradle 550 is detached from the acoustic tool 546 for acoustic isolation. During deployment, as soon as the locking arm 552 is situated in the groove 528, the tool 546 is lifted from the cradle 550 on the tubing 548 to prevent any noise propagating on the tubing 548. As the tool 546 does not touch the tubing 548 after deployment, there is acoustic isolation.

The acoustic tool 546 may be retrieved from the borehole by reversing the process by pulling the tubing 548 out of the borehole so that the cradle 550 "catches" the acoustic tool 546. When retrieving, the tubing 548 is pulled upward and the cradle 550 catches the tool 546 at the bottom. The locking arm 552 comes out from the groove 528 by the angle of the arm 552.

The present disclosure includes acoustic systems for monitoring oil and/or gas production, deployment of such systems, and modeling/measurement evaluation. To achieve long term production, changes in key reservoir parameters must be monitored in order to make appropriate decisions for well intervention.

The present disclosure provides an integrated measurement system to evaluate different physical properties of subterranean formations. In certain embodiments, permanent or semi-permanent acoustic crosswell monitoring systems may be provided in accordance with the present disclosure to investigate subterranean formations. A permanent installation may include, for example, one or more downhole acoustic source in the production well and a permanent/semi-permanent acoustic sensor array in a monitoring well, or vice versa. Note again FIG. 1.

The acoustic sources of the present disclosure are designed for excellent repeatability and to provide broadband signals. In this, generation of large high frequency energy is possible by increasing the signal duration and by the improved coupling. Several applications are envisioned including high resolution tomography, time lapse VSP, time lapse crosswell seismic, stress detection monitoring, among others.

In one possible embodiment, acoustic sources are installed in the annulus between, for example, a production tubing and the borehole casing. In this, acoustic measurements may be acquired during production by crosswell seismic measurements between the production well and the monitoring well without extracting the production string. Acoustic sources that are deployed in this configuration have to be small enough to fit in the designated annulus.

With respect to time lapse measurements, the acoustic sources of the present disclosure are repeatable with positioning error being eliminated because the retaining mechanisms for the sources are cemented in the casing. In addition, small packaging of the acoustic sources provides for the deployment of multiple sources in one well in a source array configuration.

Figure 7:
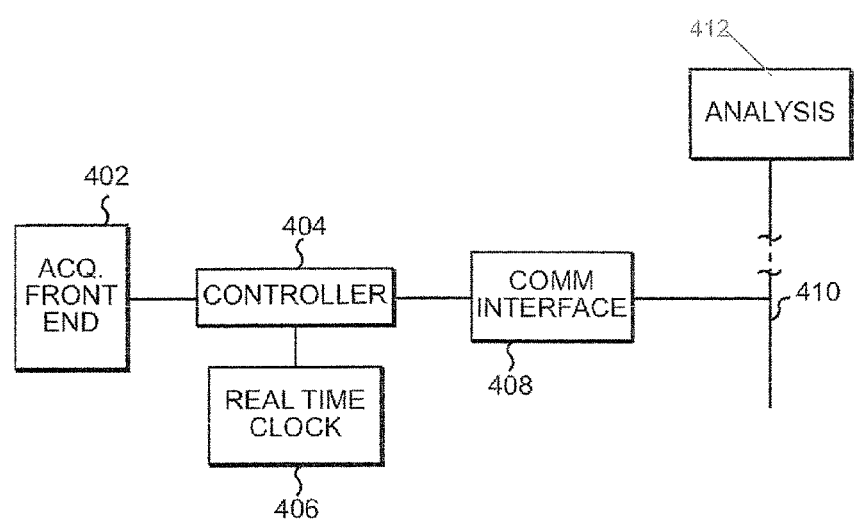
FIG. 7 is a block diagram representation of one possible seismic sensor configuration according to the principles discussed herein.

FIG. 7 shows one example of a sensor section or arrangement according to the principles discussed herein. The acquisition front end 402 is connected with the sensor elements described above, as well as their associated connections and electronics. For example, the acquisition section 402 may include electronics suitable for the relevant or desired frequencies that are to be received by the receiving device. In this, electronics for signal conditioning and digitization may be included as known to those of skill in the art. The overall operation of the system is coordinated by controller 404. The controller is capable of adjusting the acquisition parameters for section 402 and timing the start and end of acquisition, among its other functions. A real time clock 406 may be used to provide the time to the controller for the determination of when a signal is captured and for timing the appropriate collection intervals. This clock's time is used in concert with the time that the seismic signal is generated so that the travel time can be determined. Information from the controller may be sent to an analysis unit 412. In one embodiment, an analysis unit may be located at the surface of the borehole (note FIG. 1).

Communications interface 408 may be used to convey the signals output from the controller 404 to communication cable 410, and subsequently to analysis unit 412. The analysis unit may perform adaptive noise cancellation as well as determination of the signal velocity for each data collection. The functions of the analysis unit may be distributed between tools at the surface and downhole, as desirable or necessary for the operations described herein. In certain embodiments of the present disclosure, the seismic sources can be activated with the receivers at a variety of depths. This allows the system to ensure that measurements are taken at specific depths.

Referring to FIG. 8, in a method according to the present disclosure, a source retainer is positioned within a borehole at at least one depth (note flow diagram block 52). A tool is deployed in the borehole and is located or inserted in the source retainer (note block 54). Acoustic data measurements are acquired at at least one depth in the borehole (note block 56) to provide seismic information of the formation such that the measured data relate to different reservoir parameters of interest in the formation.

The acquired acoustic data are processed to determine key reservoir parameters (note block 58) relating to, for example, oil production, gas production, formation structure, among others.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A system for taking acoustic measurements relating to subterranean formations, comprising:
    at least one acoustic tool to acquire the acoustic measurements, the at least one acoustic tool comprising a spring-actuated locking arm located on an outside of a tool housing;
    a conveyance configured for movement of the acoustic tool in a borehole traversing the subterranean formations;
    a tool retainer configured or designed for permanent deployment in the borehole to removably retain the tool in the borehole so that the acoustic tool is deployed at a predetermined location and orientation relative to the subterranean formations, the tool retainer comprising a groove located on an inner surface of a borehole casing joint;
    a computer in communication with the acoustic tool; and
    a set of instructions executable by the computer that, when executed:
        process the acoustic measurements; and
        derive parameters relating to the formation based on the acoustic measurements, wherein said at least one acoustic tool is adapted to be remotely activated to place the tool in a state to form a connection with the tool retainer by extending the spring-actuated locking arm into the groove;
    wherein the acoustic tool further comprises:
        a support arm located on an outside of the tool housing; and
        a clamping pad, wherein the clamping pad is supported by at least one of the spring-actuated locking arm and the support arm, and the clamping pad is configured or designed to fit within the groove of the tool retainer.

2. The system of claim 1, wherein the acoustic tool and the tool retainer are configured or designed such that the acoustic tool is deployed in or removed from the tool retainer by the downward or upward movement of the acoustic tool by the conveyance.

3. The system of claim 1, wherein the tool further comprises three standoffs located on an outside of the tool housing; and
    the tool retainer further comprises a slide located on the inner surface of a borehole casing joint, wherein
    the tool locking arm is structured and arranged to be extendible to contact the slide of the casing joint as the tool is lowered in the borehole so that the locking arm locks into the groove of the casing joint such that the tool is stabilized and is locked to a borehole casing by the engagement of the tool locking arm and the casing joint groove to deploy the tool at a predetermined location and orientation relative to the subterranean formations.

4. The system of claim 1, further comprising an array of acoustic tools wherein each acoustic tool comprises three standoffs and a spring-actuated locking arm located outside of a tool housing; and
    the tool retainer comprises a plurality of borehole casing joints, each casing joint having a slide and a groove located on an inner surface of the casing joint, wherein
    the tool locking arm of each acoustic tool is structured and arranged to be extendible to contact the slide of a corresponding one of the plurality of borehole casing joints as the tool array is lowered in the borehole so that the locking arm of each acoustic tool locks into a corresponding groove of one of the plurality of casing joints such that each tool of the acoustic tool array is stabilized and is locked to a borehole casing to deploy each tool of the tool array at a predetermined location and orientation relative to the subterranean formations, and
    sections of the conveyance between adjacent tools of the acoustic tool array have slack to prevent acoustic propagation between tools through the conveyance.

5. The system of claim 1, further comprising an array of receivers configured or designed to be located in an adjacent borehole traversing the subterranean formations; and
    the system is configured for crosswell data acquisition.

6. The system of claim 1, further comprising a seabed cable having an array of spaced receivers configured or designed to be located at a seabed; and the system is configured for marine data acquisition.

7. The system of claim 1, wherein the acoustic tool comprises a bottom hole assembly; and
the system is configured for while-drilling data acquisition.

8. The system of claim 1, further comprising:
a controller section operably connected to at least one receiver and configured to adjust data acquisition parameters;
a communications interface operably connected to the controller;
a processing unit, wherein the at least one receiver is configured to transmit electrical signals through the controller section and the communications interface to the processing unit, and
the processing unit is configured to perform signal processing using the electrical signals from the at least one receiver.

9. The system of claim 1, wherein the groove of the tool retainer has a sloping surface.

10. The system of claim 1, wherein the spring-actuated locking arm of the acoustic tool is engaged with the groove of the tool retainer at an angle less than 90 degrees relative to the outside of the tool housing.

11. The system of claim 1, wherein the groove of the tool retainer is configured or designed to accommodate the clamping pad having a specific size.

12. The system of claim 11, wherein the specific size is related to a depth at which the tool retainer is deployed in the borehole, the specific size being larger at a deeper depth in the borehole as compared to a shallower depth.

13. A system comprising:
a cable;
a plurality of acoustic tools deployed into a well on the cable, each of the acoustic tools comprising a spring-actuated locking arm located on an outside of a tool housing;
a plurality of tool retainers adapted to be permanently deployed in the well to removably retain the tools in the well so that the plurality of acoustic tools are deployed at predetermined locations and orientations relative to subterranean formations, each of the tool retainers comprising a groove located on an inner surface of a borehole casing joint;
a computer in communication with the plurality of acoustic tools; and
a set of instructions executable by the computer that, when executed:
process the acoustic measurements; and
derive parameters relating to the formation based on the acoustic measurements, wherein each of the acoustic tools is adapted to be remotely activated to place the tool in a state to form a connection with a tool retainer of the plurality of tool retainers by extending the spring-actuated locking arm into the groove;
wherein each of the acoustic tools further comprises:
a support arm located on an outside of the tool housing; and
a clamping pad, wherein the clamping pad is supported by at least one of the spring-actuated locking arm and the support arm, and the clamping pad is configured or designed to fit within the groove of at least one of the tool retainers.

14. The system of claim 13, wherein each acoustic tool of the plurality of acoustic tools is adapted to be remotely activated from an earth surface of the well when the plurality of tools are near the plurality of tool retainers.

15. The system of claim 13, wherein the plurality of tool retainers are adapted to allow the cable to become slack in response to the retention of all of the acoustic tools in the retainers.

16. The system of claim 13, wherein the groove of each of the tool retainers has a sloping surface.

17. The system of claim 13, wherein the spring-actuated locking arm of each of the acoustic tools is engaged with the groove of each of the tool retainers at an angle less than 90 degrees relative to the outside of the tool housing.

18. The system of claim 13, wherein the clamping pad of each of the acoustic tools is a different size.

19. The system of claim 18, wherein the groove of each of the tool retainers is configured or designed to accommodate one of the clamping pads having a specific size.

20. The system of claim 19, wherein the clamping pad of one of the acoustic tools and the corresponding groove of one of the tool retainers deployed deeper in the well are larger than the clamping pad of one of the acoustic tools and the corresponding groove of one of the tool retainers deployed shallower in the well.

* * * * *